(12) United States Patent
Smith et al.

(10) Patent No.: US 11,897,210 B2
(45) Date of Patent: Feb. 13, 2024

(54) CAUL PLATE SYSTEM FOR AIRCRAFT FABRICATION

(71) Applicant: The Boeing Company, Chicago, IL (US)

(72) Inventors: Daniel R. Smith, Mill Creek, WA (US); Darrell D. Jones, Mill Creek, WA (US); Byron James Autry, Charleston, SC (US); James R. Kendall, Mount Pleasant, SC (US); Raviendra Sidath Suriyaarachchi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,265

(22) Filed: Nov. 10, 2021

(65) Prior Publication Data

US 2022/0152956 A1   May 19, 2022

Related U.S. Application Data

(60) Provisional application No. 63/115,041, filed on Nov. 18, 2020.

(51) Int. Cl.
  *B29C 70/54* (2006.01)
  *B29C 70/34* (2006.01)
  *B29C 70/44* (2006.01)

(52) U.S. Cl.
  CPC .......... *B29C 70/549* (2021.05); *B29C 70/342* (2013.01); *B29C 70/443* (2013.01)

(58) Field of Classification Search
  CPC ..... B29C 70/44; B29C 70/549; B29C 70/342; B29C 70/443
  See application file for complete search history.

(56) References Cited

U.S. PATENT DOCUMENTS

| | | | |
|---|---|---|---|
| 2003/0227107 A1 | 12/2003 | Stewart | |
| 2005/0104248 A1* | 5/2005 | Younie | B29C 33/3821 425/389 |
| 2012/0298296 A1 | 11/2012 | Thompson et al. | |
| 2013/0014887 A1* | 1/2013 | Jagos | B29C 33/44 156/536 |

(Continued)

FOREIGN PATENT DOCUMENTS

| | | |
|---|---|---|
| DE | 102013000307 A1 | 7/2014 |
| DE | 102017105343 A1 | 9/2018 |

(Continued)

OTHER PUBLICATIONS

European Patent Office Extended Search Report, dated Sep. 2, 2022, regarding Application No. 21207369.6, 19 pages.

(Continued)

*Primary Examiner* — Yunju Kim
(74) *Attorney, Agent, or Firm* — Yee & Associates, P.C.

(57) ABSTRACT

Methods and apparatus involved in the process of hardening a composite part are disclosed herein. The methods include applying a preform to a mandrel, covering the preform with a caul plate, sealing the caul plate to the mandrel, pushing the caul plate toward the preform and the mandrel and hardening the preform into a composite part while the caul plate is held against the preform. The apparatus include a mandrel, a caul plate which defines a surface of a preform and where the caul plate may include a rigid material and seals disposed between the mandrel and the caul plate. In an additional aspect, the apparatus may include a sealed chamber with a mandrel and a caul plate and a circumferential seal between the mandrel and the caul plate.

24 Claims, 15 Drawing Sheets

(56) References Cited

U.S. PATENT DOCUMENTS

| | | | |
|---|---|---|---|
| 2014/0134383 A1* | 5/2014 | Hugon | B29C 66/7392 |
| | | | 156/182 |
| 2014/0367039 A1* | 12/2014 | Robins | B29C 43/36 |
| | | | 156/286 |
| 2015/0102535 A1 | 4/2015 | Lutz | |
| 2016/0176073 A1* | 6/2016 | Spexarth | B29C 35/02 |
| | | | 264/39 |
| 2017/0057182 A1* | 3/2017 | Bernetich | B29C 70/546 |
| 2017/0252982 A1* | 9/2017 | Knutson | B29C 53/02 |
| 2020/0055265 A1* | 2/2020 | Seegel | B29C 70/446 |
| 2020/0070436 A1 | 3/2020 | Miller et al. | |

FOREIGN PATENT DOCUMENTS

| | | |
|---|---|---|
| EP | 0517416 A1 | 12/1992 |
| EP | 2899013 A1 | 7/2015 |
| EP | 3112145 A1 | 1/2017 |
| EP | 3287247 A1 | 2/2018 |
| EP | 3549751 A1 | 10/2019 |
| WO | 2006001860 A2 | 1/2006 |
| WO | 2008007043 A1 | 1/2008 |
| WO | 2015158865 A1 | 10/2015 |

OTHER PUBLICATIONS

Netherlands Patent Office Written Opinion and Search Report with English Translation, dated Jun. 28, 2021, regarding Application No. NL2027386, 14 pages.

"Glossary of Terms", Composites, ASM International, vol. 21, Dec. 2001, 13 pages.

European Patent Office Partial Search Report, dated Apr. 19, 2022, regarding Application No. 21207369.6, 17 pages.

* cited by examiner

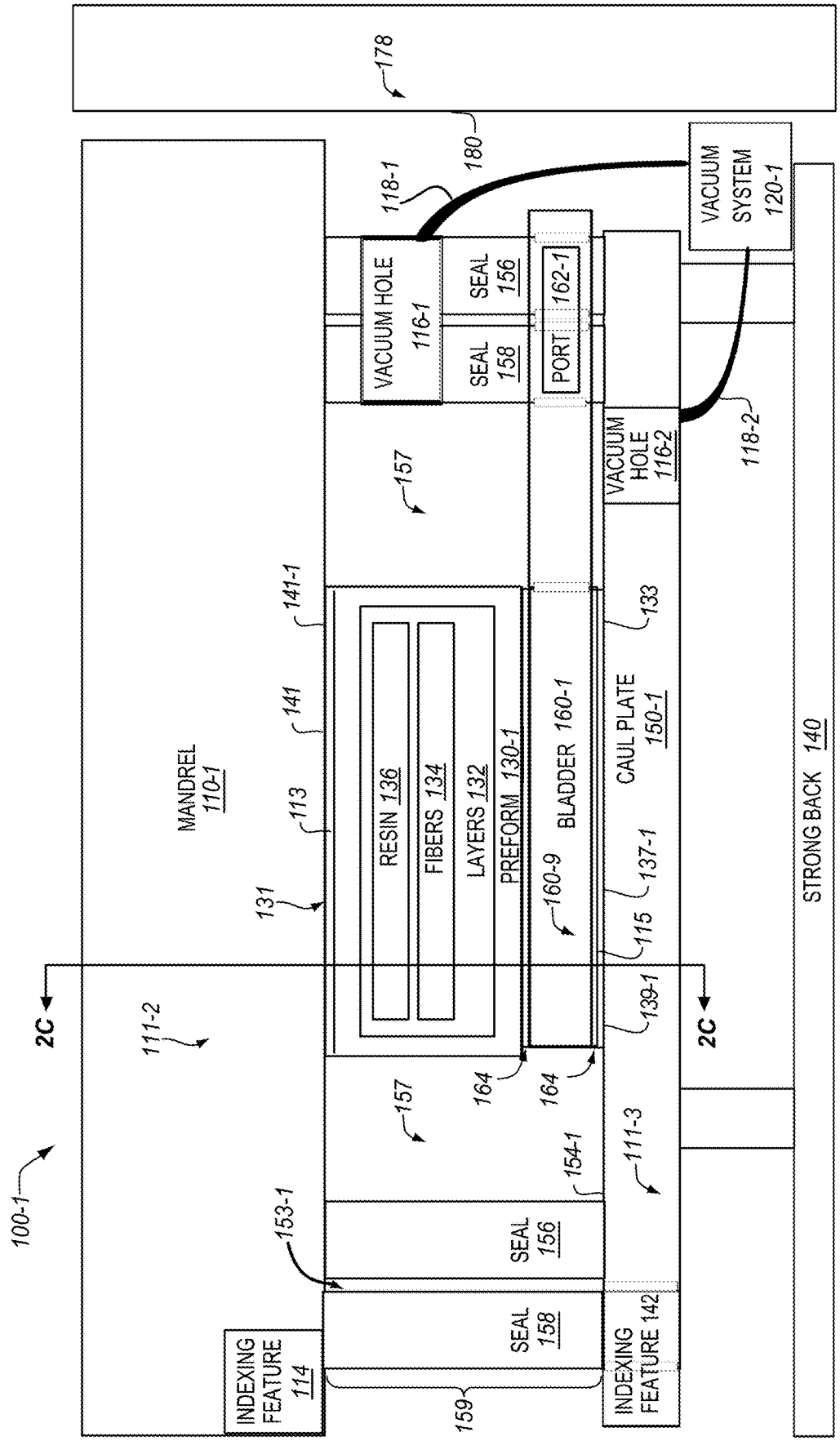

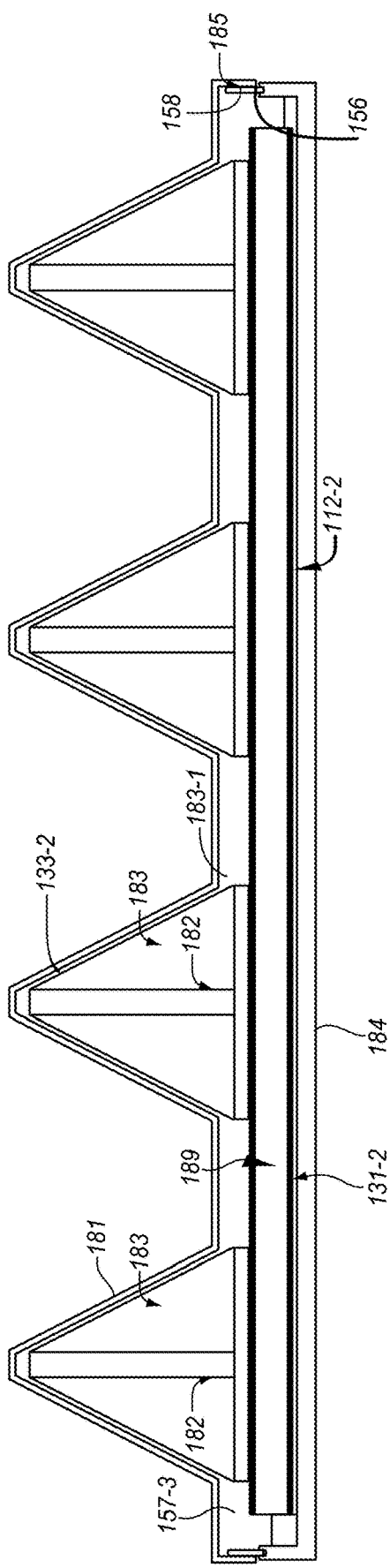
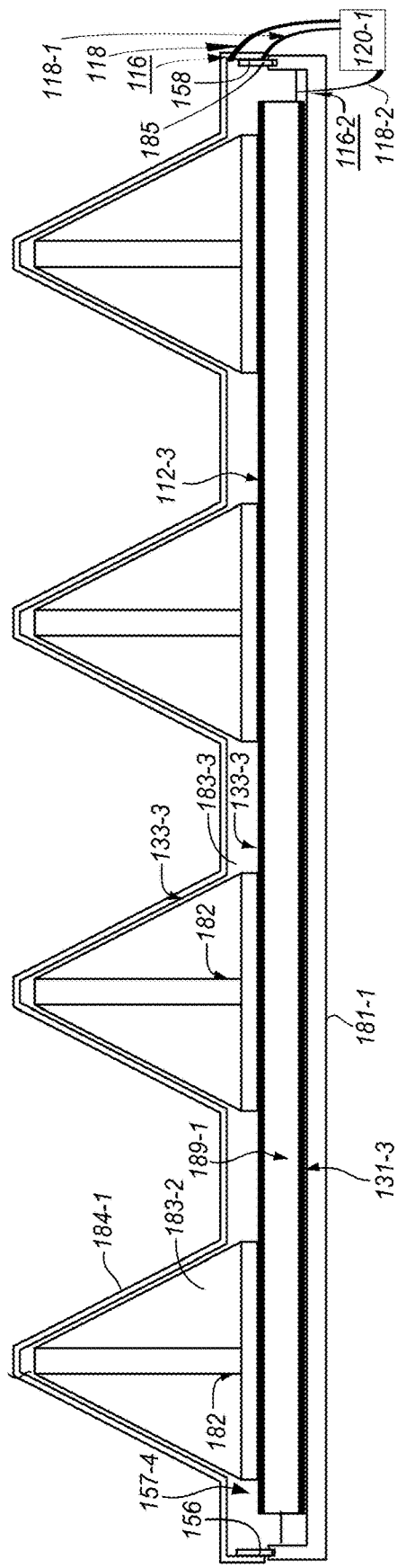

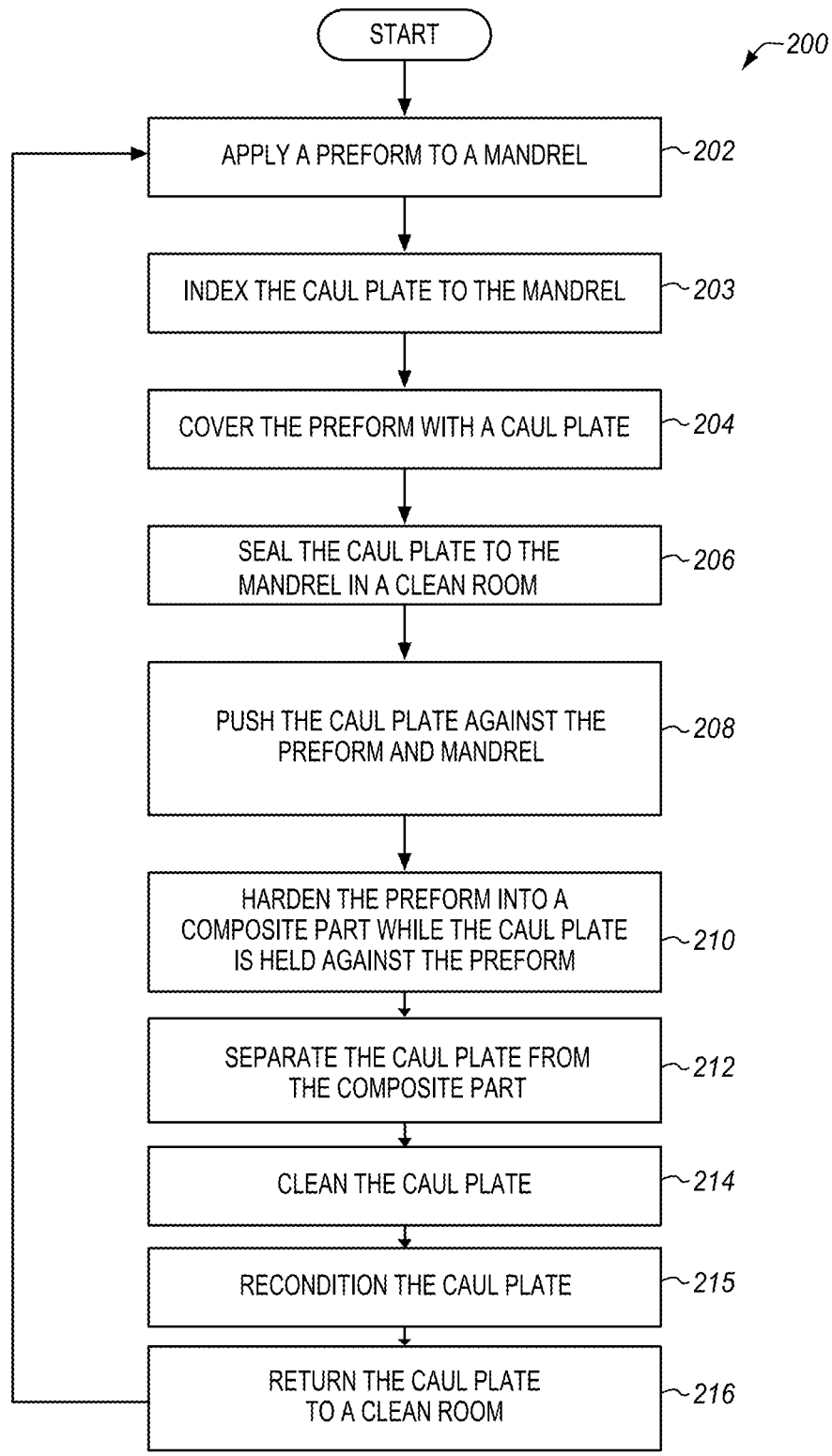

CAUL PLATE SYSTEM FOR AIRCRAFT FABRICATION

CROSS-REFERENCE TO RELATED APPLICATION

This application claims the benefit of U.S. Provisional Patent Application Ser. No. 63/115,041, filed Nov. 18, 2020, and entitled "Caul Plate System for Aircraft Fabrication;" which is incorporated herein by reference in its entirety.

FIELD

The disclosure relates to the field of fabrication, and in particular, to fabricating composite parts for sections of an aircraft.

BACKGROUND

Prior to autoclave processing, composite components are enclosed in vacuum bag for the duration of a cure cycle. Vacuum bagging processes for large and/or complex composite sections, such as that of a fuselage or a wing, remain cumbersome manual processes, and vacuum bags that cover large-scale preforms may experience undesirable stretching, rips or tears (e.g., during application, prior to autoclave processing or during autoclave processing). A seal failure, rip, or tear introduces the possibility of compromised performance of the vacuum bag, which may result in a need for reworking or rejecting a resulting part. To address concerns related to a seal failure, ripping, and/or tearing, often "double bagging" and a variety of pressure checks are involved, which may further increase cycle time, material costs, and associated labor. All of these factors result in an undesirable increase in the overall cost of the composite component.

Therefore, it would be desirable to have a method and apparatus that take into account at least some of the issues discussed above, as well as other possible issues.

SUMMARY

Embodiments described herein provide caul plates that themselves form a vacuum seal with a mandrel in order to apply consolidation pressure while hardening a preform for a composite part. By utilizing the caul plate itself in a role normally reserved for vacuum bags, vacuum bags themselves can be foregone. Thus, methods and apparatus described herein advantageously reduce the amount of labor and material involved in the hardening process. The methods include applying a preform to a mandrel, covering the preform with a caul plate, sealing the caul plate to the mandrel, pushing the caul plate toward the preform and the mandrel and hardening the preform into a composite part while the caul plate is held against the preform.

In one aspect, an apparatus for hardening a preform of fiber reinforced material may include a mandrel, a caul plate which defines a surface of a preform, and where the caul plate may include a rigid material and seals disposed between the mandrel and the caul plate. In an additional aspect, an apparatus for consolidating a preform of fiber reinforced material may include a sealed chamber with a mandrel and a caul plate and a circumferential seal between the mandrel and the caul plate.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 2A is a block diagram of an alternative assembly system that directly vacuum seals a caul plate to a mandrel in an illustrative embodiment.

FIG. 2D shows a caul plate for a wing panel in an illustrative embodiment.

FIG. 2E shows a caul plate for a wing panel in an illustrative embodiment.

FIG. 3 is a flowchart for a method for operating an assembly system to harden a preform in an autoclave an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The caul plates and mandrels described herein are utilized to fabricate composite parts. Composite parts, such as Carbon Fiber Reinforced Polymer (CFRP) parts, are initially laid-up in multiple layers of carbon fiber reinforced material that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
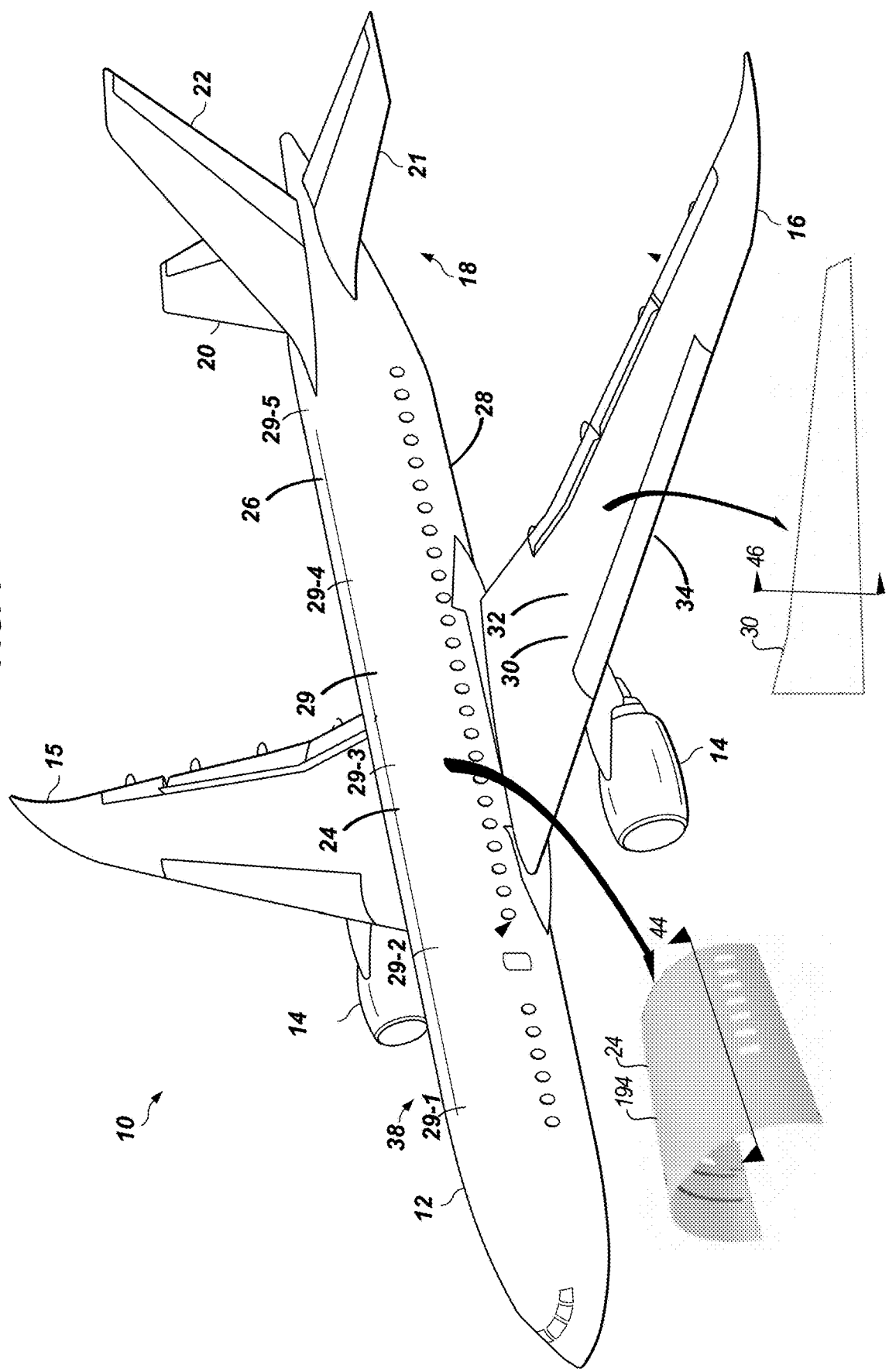
FIG. 1 shows an aircraft in an illustrative embodiment.

FIG. 1 depicts an aircraft is in which an illustrative embodiment may be implemented. Aircraft 10 is an example of an aircraft which can be formed with caul plate 150, 150-1 of FIG. 2 and FIG. 2A, respectively. Aircraft 10 is an example of an aircraft 10 which is formed of in a half barrel shape as half barrel section 24 of fuselage 12.

In this illustrative example, aircraft 10 has wing 15 and wing 16 attached to body 38. Aircraft 10 includes engine 14 attached to wing 15 and engine 14 attached to wing 16.

Body 28 has tail section 18. Horizontal stabilizer 20, horizontal stabilizer 21, and vertical stabilizer 22 are attached to tail section 18 of body 38.

Fuselage 12 is fabricated from half barrel section 24 with an upper half barrel section 26 joined to a lower half barrel section 28 to form a full barrel section 29 (e.g., 29-1, 29-2, 29-3, 29-4, 29-5). The full barrel sections are joined serially to form fuselage 12.

Wings 15 and 16 are formed of wing panel 30 comprising upper wing panel 32 and a lower wing panel 34 joined together. Section cut 46 is a cut-through of wing panel 30 and prior to being hardened corresponds to wing panel preform 189, 189-1 (FIGS. 2D and 2E). Section cut 46 is orientated chord wise roughly perpendicular to blade stringers 182.

Figure 2:
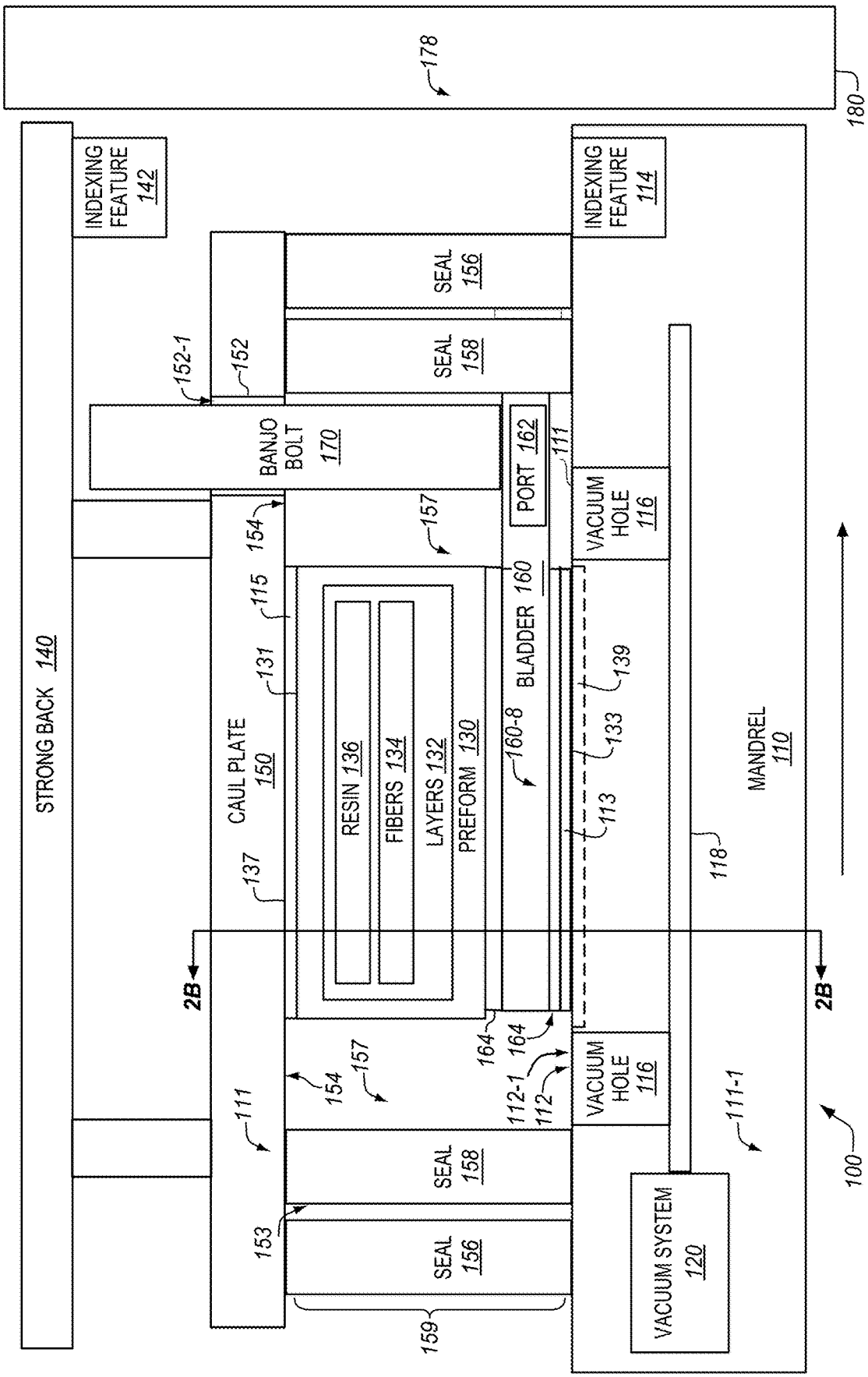
FIG. 2 is a block diagram of an assembly system that directly vacuum seals a caul plate to a mandrel in an illustrative embodiment.
Figure 2B:
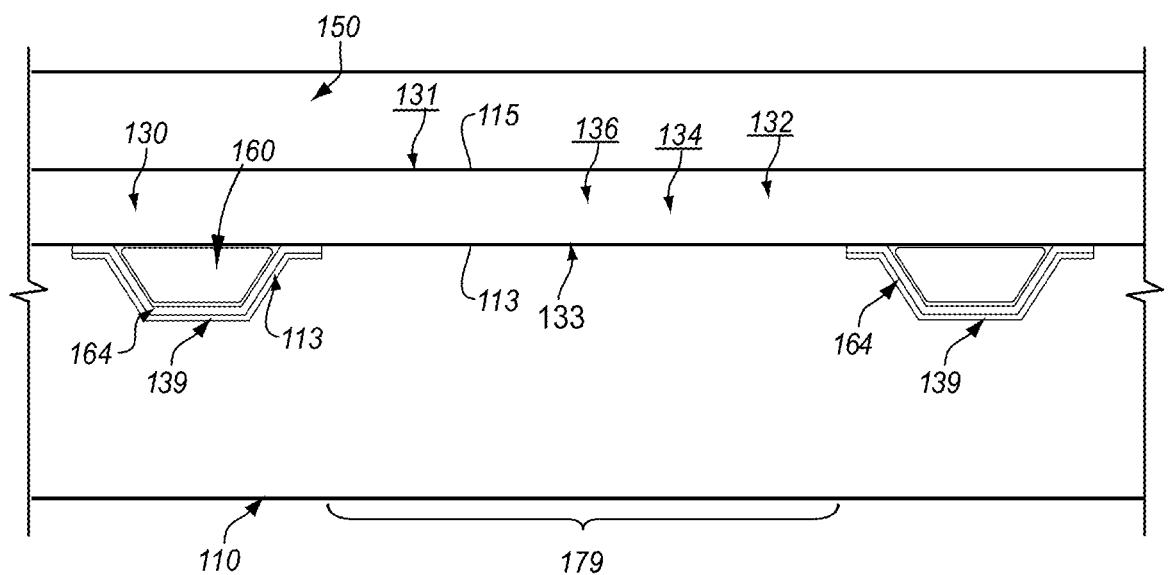
FIG. 2B is a section cut view of a bladder that reinforces a stringer in an illustrative embodiment.
Figure 2C:
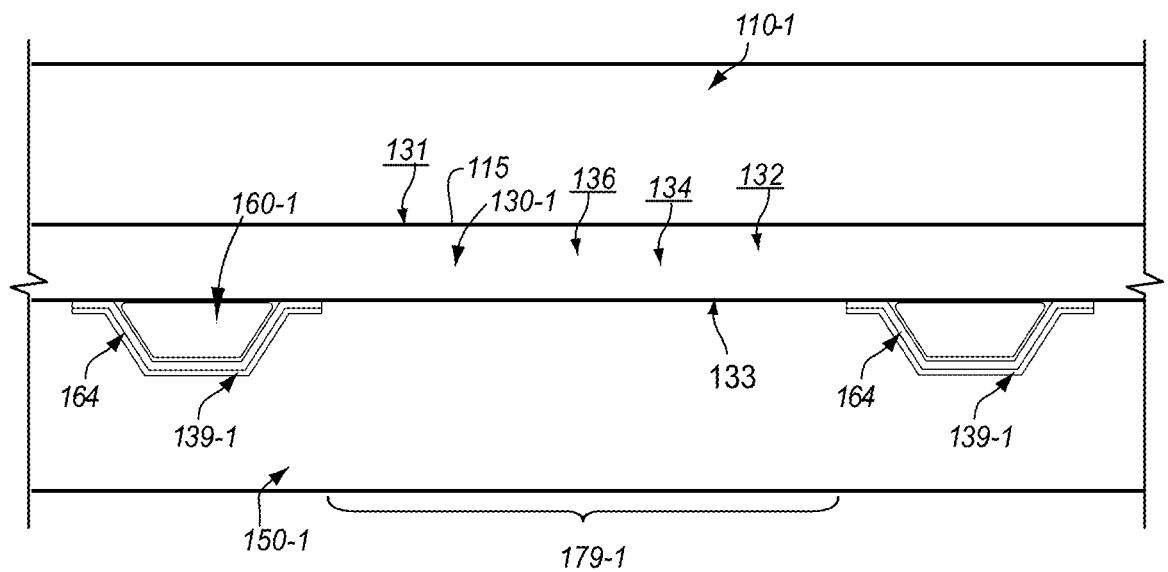
FIG. 2C is a section cut view of a bladder that reinforces a stringer in an illustrative embodiment.

Section cut 44 is a cut-through of composite part 194 and prior to being hardened corresponds to preform 130, 130-1 (FIGS. 2B and 2C). Section cut 44 is orientated longitudinally through a contour 112-1 along a stringer.

FIG. 2 is a block diagram of an assembly system 100 that directly vacuum seals a caul plate 150 to a mandrel 110 (e.g., a layup mandrel) in an illustrative embodiment. The caul plate 150 is made from a rigid material 111, such as metal, composite material, etc. The caul plate 150 remains rigid against a preform 130 at hardening temperatures and compression forces. In this embodiment, the caul plate 150 defines a mold line 137 such as an Outer Mold Line (OML) 131 for the preform 130, and the mandrel 110 forms an Inner Mold Line (IML) 133 for the preform 130. In some examples, a release film 113 is located between mandrel 110 and the preform 130. Release film 113 is disposed at the mandrel 110 to facilitate demolding after hardening in an autoclave 180 has been performed. In some examples, a breather treatment 115 facilitates hardening processes by enabling trapped gas to exit the preform 130 and to facilitate evacuated gas distribution across the preform during hardening.

In this embodiment, the mandrel 110 includes a rigid body 111-1 that forms a half barrel shape, which appears rectangular from this cross-sectional view point (i.e., wherein one half of the half barrel is shown). In this embodiment, the mandrel 110 defines an EVIL 133 for the preform 130. The mandrel 110 includes a layup surface 112 that defines a contour 112-1 for a preform 130 comprising multiple layers 132 of fibers 134 and resin 136. The mandrel 110 further includes an indexing feature 114 that mates with an indexing feature 142 of a strongback 140 that transports the caul plate 150 to the mandrel 110. This enables a location of the caul plate 150 relative to the mandrel 110 to be precisely enforced each time a caul plate 150 is placed at the mandrel 110.

The mandrel 110 further includes vacuum system 120. Vacuum system 120 controllably or otherwise applies vacuum to vacuum holes 116 via vacuum line 118, which acts as a type of manifold distributor of vacuum to selected locations of the mandrel 110. Vacuum holes 116 are disposed at the mandrel 110, and apply vacuum beyond the layup surface 112. That is, vacuum holes 116 directly apply vacuum to sealed chamber 157 including locations 154 at the caul plate 150. Vacuum system 120 evacuates air from a sealed chamber 157 bound by caul plate 150, circumferential seal 156 and mandrel 110. Evacuating sealed chamber 157 along with atmospheric pressure outside of the caul plate 150, circumferential seal 156 and mandrel 110 enclosure, results in pushing the caul plate 150 towards the mandrel 110 and consolidating preform 130. To reiterate, by reducing pressure under the caul plate 150 to less than the atmospheric pressure of the autoclave, the caul plate 150 is pushed down via atmospheric pressure onto the mandrel 110. In a further embodiment, a vacuum is introduced into the sealed chamber 157 through the caul plate 150 instead of, or in addition to, through the mandrel 110 and/or through the circumferential seal 156 and circumferential seal 158.

Circumferential seal 156 and circumferential seal 158 are disposed between the mandrel 110 and the caul plate 150, along a periphery of an intersection 159 between the mandrel 110 and the caul plate 150. In this embodiment, the circumferential seal 156 and circumferential seal 158 comprise a first circumferential seal 156, and a second circumferential seal 158 that is disposed entirely within the first circumferential seal 156. However, in further embodiments a triple seal or even more seals may be implemented, and each seal is pressure tested to ensure that it forms a sealed chamber 157. The circumferential seal 156 and circumferential seal 158 seal off a chamber 153 there between. Multiple seals provide a fall back of redundant circumferential seal 156 and circumferential seal 158 in case one of the seals fails. The remaining circumferential seal 156 or circumferential seal 158 will help to maintain the vacuum in sealed chamber 157 and prevent the preform from being exposed to atmospheric pressure within sealed chamber 157 during processing. The circumferential seal 156 and circumferential seal 158 run along the entire circumference of the caul plate 150, but are shown at discrete cross-sectional locations in FIG. 2 for the sake of clarity. These components enable the caul plate 150 to be circumferentially sealed to the mandrel 110. The circumferential seal 156 and circumferential seal 158 can be implemented as expendable or reusable components. Hence, the boxes referring to circumferential seal 156 both represent a first circumferential seal 156, and the boxes referring to circumferential seal 158 both represent a second circumferential seal 158 that is distinct from the first circumferential seal 156. In some embodiments a third circumferential seal 155, not shown in FIG. 2, may be included. Some intermediary materials and layers between caul plate 150 and mandrel 110, such as breather treatments, release films, etc., are not illustrated in FIG. 2 for the sake of ensuring clarity.

FIG. 2 further depicts one or more of bladder 160, which are placed within one or more of stringer preform 164 to provide inflation pressure to resist crushing during hardening while the caul plate 150 presses against the preform 130. The interior 160-8 of bladder 160 is opened to atmospheric pressure 178 which is the pressure inside or outside of the autoclave 180. When the bladder 160 is open to the atmospheric pressure 178 it inflates the bladder 160 when sealed chamber 157 is evacuated. That is, the bladder 160 operates as internal tooling that maintains structural support for stringer preform 164 during hardening. Specifically, the bladder 160 resists crushing forces applied to the stringer preform 164 during processing, which enables the stringer preform 164 to retain their shape. Bladder 160 include inflation ports 162 to pressurize and shape one or more portions of the stringer preform 164. Bladder 160 is disposed between the caul plate 150 and the mandrel 110, and the caul plate 150 includes openings disposed at inflation ports 162 for the bladder 160. Inflation port 162 aligns with opening 152 at the caul plate 150. The inflation ports 162 are fastened through openings in the caul plate 150. A banjo bolt 170 seals the caul plate 150 to the bladder 160, and provides a passageway for air to enter the bladder 160 through the caul plate 150. The seal 152-1 prevents air from leaking/escaping via opening 152.

Further, FIG. 2 is a cross-sectional view through a longitudinal length of a trough 139 of mandrel 110. The mandrel 110 includes trough 139 holding stringer preform 164 enveloping bladder 160 and located under preform 130 and mandrel 110. A cross-section 179, shown in FIG. 2B between troughs 139, would have the same cross-section components as shown in FIG. 2 from strongback 140 to mandrel 110, with the exception of trough 139 and its content including the stringer preform 164 and enveloped bladder 160. This cross-section is located between troughs 139 and is an embodiment illustrated in FIG. 2B.

An autoclave 180, (of which only a portion is shown) receives the mandrel 110, and applies heat and pressure to harden preform 130 into a composite part 194. After hardening has been completed, the caul plate 150 is removed. Indexing features and other components may be added to the composite part 194, and/or a manufacturing excess thereof. The composite part 194 is demolded from the mandrel 110, and the mandrel 110 and the caul plate 150 are re-used to fabricate another composite part 194. In further embodiments, the mandrel 110 and the caul plate 150 are advanced in pulses or continuously through the various stations described herein.

FIG. 2A is a block diagram of an assembly system 100-1 that directly vacuum seals a caul plate 150-1 to a mandrel 110-1, such as a layup mandrel, in an illustrative embodiment. The caul plate 150-1 is made from a rigid material 111-3, such as metal, composite material, etc. The caul plate 150-1 remains rigid against a preform 130-1 at hardening temperatures and compression forces. In this embodiment, the caul plate 150-1 defines a mold line 137-1 such as an Inner Mold Line (IML) 133 for the preform 130-1, and the mandrel 110-1 forms an Outer Mold Line (OML) 131 for the preform 130-1. In some examples, release film 113 is located between mandrel 110-1 and the preform 130-1. Release film 113 is disposed at the mandrel 110-1 to facilitate demolding after hardening has been performed. In some examples, a breather treatment 115 facilitates hardening processes by enabling trapped gas to exit the preform 130-1 and to facilitate evacuated gas distribution across the preform during hardening.

Figure 12:
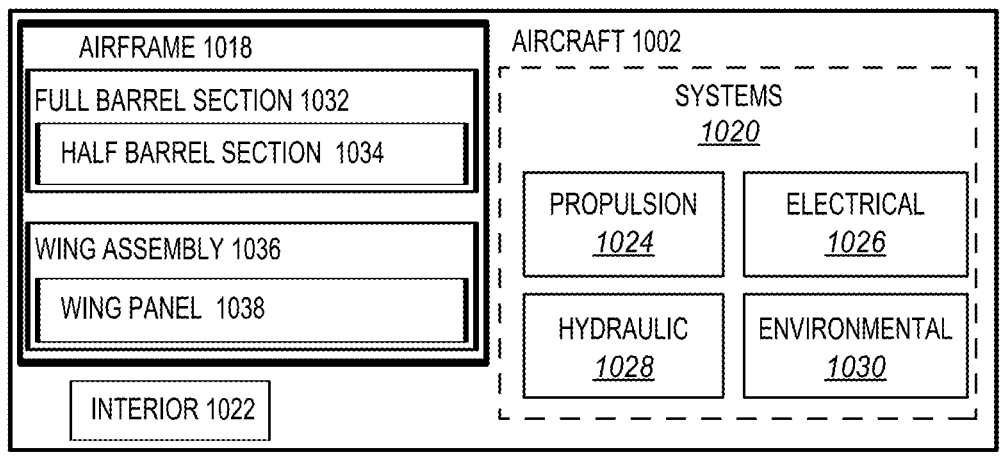
FIG. 12 is a block diagram of an aircraft in an illustrative embodiment.

In this embodiment, the mandrel 110-1 includes a rigid body 111-2 that forms a half cylindrical shape complementary to a half barrel section 1034 of FIG. 12. When two half barrel sections 1034 are joined to form a full barrel section 1032. The mandrel 110-1 appears rectangular in the FIG. 2A cross-sectional view. In this embodiment, the mandrel 110-1 defines an OML 131 for the preform 130-1. The mandrel 110-1 includes a layup surface 141 that defines a contour 141-1 for a preform 130-1 comprising multiple layers 132 of fibers 134 and resin 136. The mandrel 110-1 further includes an indexing feature 114 that mates with an indexing feature 142 of a strongback 140 that transports the caul plate 150-1 to the mandrel 110-1. This enables a location of the caul plate 150-1 relative to the mandrel 110-1 to be precisely enforced each time a caul plate 150-1 is placed at the mandrel 110-1.

An embodiment has a vacuum system 120-1 evacuating sealed chamber 157-1 through the circumferential seal 156 and circumferential seal 158. Vacuum system 120-1 controllably or otherwise applies vacuum to vacuum holes 116-1 and 116-2 via vacuum lines 118-1 and 118-2, respectively. Vacuum holes 116-1 are disposed through circumferential seal 156 and circumferential seal 158 and/or through caul plate 150-1, and apply vacuum to sealed chamber 157. That is, vacuum holes 116-1 and/or 116-2 directly apply vacuum to sealed chamber 157 including locations 154-1 at the caul plate 150-1. Vacuum system 120-1 evacuates air from a sealed chamber 157 that directly borders the caul plate 150-1 and the mandrel 110-1. Evacuating sealed chamber 157 along with atmospheric pressure outside of the caul plate 150-1, circumferential seal 156 and mandrel 110-1 enclosure, results in pushing the caul plate 150-1 towards the mandrel 110-1 and consolidating preform 130-1. To reiterate, by reducing pressure under the caul plate 150-1 to less than the atmospheric pressure of the autoclave, the caul plate 150-1 is pushed down via atmospheric pressure onto the mandrel 110-1. In a further embodiment, a vacuum is introduced into the sealed chamber 157 through the caul plate 150-1 instead of, or in addition to, through the mandrel 110-1 as shown in FIG. 2 and/or through the circumferential seal 156 and circumferential seal 158.

Circumferential seal 156 and circumferential seal 158 are disposed between the mandrel 110-1 and the caul plate 150-1, along a periphery of an intersection 159 between the mandrel 110-1 and the caul plate 150-1. In this embodiment, the circumferential seal 156 and circumferential seal 158 comprise a first circumferential seal 156, and a second circumferential seal 158 that is disposed entirely within the first circumferential seal 156. However, in further embodiments a triple circumferential seal or even more seals may be implemented, and each circumferential seal is pressure tested to ensure that it forms a sealed chamber 157. The circumferential seal 156 and circumferential seal 158 seal off a chamber 153-1 there between. Multiple seals provide a fall back of redundant circumferential seal 156 and circumferential seal 158 in case one of the seals fails. The remaining circumferential seal 156 or circumferential seal 158 will help to maintain the vacuum in sealed chamber 157 and prevent the preform from being exposed to atmospheric pressure within sealed chamber 157 during processing. The circumferential seal 156 and circumferential seal 158 run along the entire circumference of the caul plate 150-1, but are shown at discrete cross-sectional locations in FIG. 2A for the sake of clarity. These components enable the caul plate 150-1 to be circumferentially sealed to the mandrel 110-1. The circumferential seal 156 and circumferential seal 158 can be implemented as expendable or reusable components. Hence, the boxes referring to circumferential seal 156 both represent a first circumferential seal 156, and the boxes referring to circumferential seal 158 both represent a second circumferential seal 158 that is distinct from the first circumferential seal 156. In some embodiments a third circumferential seal 155, not shown in FIG. 2A, may be included. Some intermediary materials and layers between caul plate 150 and mandrel 110, such as breather treatments, release films, etc., are not illustrated in this FIG. 2A for the sake of ensuring clarity.

FIG. 2A further depicts one or more of bladders 160-1, which are placed within one or more of stringer preform 164 to provide inflation pressure to resist crushing during hardening while the caul plate 150-1 presses against the preform 130-1. The interior 160-9 of bladders 160-1 are opened to atmospheric pressure 178 which is the pressure inside or outside of the autoclave 180. Bladders 160-1 are opened to atmospheric pressure 178 which is the pressure inside or outside of the autoclave 180. When the bladders 160-1 are open to the atmospheric pressure 178, the bladders 160-1 inflate when sealed chamber 157 is evacuated. That is, the bladders 160-1 operate as internal tooling that maintains structural support for stringer preform 164 during hardening. Specifically, the bladders 160-1 resist crushing forces applied to the stringer preform 164 during processing, which enables the stringer preform 164 to retain their shape. Bladders 160-1 include inflation ports 162 to pressurize and shape one or more portions of the stringer preform 164-1 during hardening. Bladders 160-1 are disposed between the caul plate 150-1 and the mandrel 110-1. In one embodiment shown in FIG. 2A, inflation port 162-1 passes through circumferential seal 156 and circumferential seal 158 and provides a passageway for air to enter the bladder 160.

Further, FIG. 2A is a cross-sectional view through a longitudinal length of a trough 139-1 of caul plate 150-1. The caul plate 150-1 includes a trough 139-1 holding the stringer preform 164 enveloping the bladder 160-1 and located under the preform 130-1 and mandrel 110-1. A cross-section 179-1, shown in FIG. 2C between troughs 139-1, would have the same cross-section components as shown in FIG. 2A from strongback 140 to mandrel 110-1, with the exception of trough 139-1 and its content including the stringer preform 164 and enveloped bladder 160-1. This cross-section 179-1 is located between troughs 139-1 and is an embodiment illustrated in FIG. 2C.

An autoclave 180 (shown in greater detail at autoclave 820 in FIG. 9) receives the mandrel 110-1, preform 130-1 and caul plate 150-1, and applies heat and pressure to harden preform 130-1 into a composite part 194. After hardening has been completed, the caul plate 150-1 is removed. Indexing features and other components may be added to the composite part 194, and/or a manufacturing excess thereof. The composite part 194 is demolded from the mandrel 110-1, and the mandrel 110-1 and the caul plate 150-1 are re-used to fabricate another composite part 194. In further embodiments, the mandrel 110-1 and the caul plate 150-1 are advanced in pulses or continuously through the various stations described herein.

FIG. 2B corresponds with view arrows 2B of FIG. 2, and illustrates a section cut view of the various components discussed above. As shown in FIG. 2B, the bladder 160 is placed within a stringer preform 164 in trough 139, and positively pressurized when the caul plate 150 is sealed to mandrel 110 and sealed chamber 157 is evacuated around the stringer preform 164. The bladder 160 helps to maintain structural support for the stringer preform 164, which prevents the stringer preform 164 from altering shape during the hardening process. In this embodiment, the mandrel 110 defines an EVIL 133 and the caul plate 150 defines the OML 131 for the preform 130. This embodiment facilitates placement of the stringer preform 164 and bladders 160 upon the mandrel 110 and then preform 130 is laid upon the stringer preform 164, bladder 160 and mandrel 110. This embodiment supports IML 133 tooling for a half barrel section 24.

FIG. 2C corresponds with view arrows 2C of FIG. 2A, and illustrates a section cut view of the various components discussed above. As shown in FIG. 2C, the bladder 160-1 is placed within a stringer preform 164 in trough 139-1, and positively pressurized when the caul plate 150-1 is sealed to mandrel 110-1 and sealed chamber 157 is evacuated around the stringer preform 164 and preform 130-1. The bladder 160-1 helps to maintain structural support for the stringer preform 164, which prevents the stringer preform 164 from altering shape during the hardening process. In this embodiment, the mandrel 110-1 defines an OML 131 and the caul plate 150-1 defines the IML 133 for the preform 130-1. An embodiment facilitates layup of preform 130-1 upon mandrel 110-1 and then placement of the stringer preform 164 and bladders 160 upon the mandrel 110 and then caul plate sealed to the mandrel 110-1 to complete the assembly prepared for hardening in an autoclave 180. This embodiment supports OML 131 tooling for a half barrel section 24.

FIG. 2D illustrates a caul plate 181 for a wing panel preform 189 in an illustrative embodiment. Wing panel preform 189 is laid up upon mandrel 184. Then blade stringers 182 are placed upon wing panel preform 189. Then support tooling 183 and 183-1 is placed upon blade stringers 182 and upon wing panel preform 189. A caul plate 181, having a custom shape to provide an IML 133-2, is overlaid atop blade stringers 182 and support tooling 183 and 183-1 such as stringer mandrels. Circumferential seal 156 and circumferential seal 158 are disposed at the periphery of the caul plate 181 and the mandrel 184 and provide seal redundancy. As shown in FIG. 2, vacuum system 120 controllably or otherwise applies vacuum to vacuum holes 116 via vacuum line 118, which acts as a type of manifold distributor of vacuum to selected locations of the mandrel 110. Vacuum holes 116 are disposed at the mandrel 110-1, and apply vacuum beyond the layup surface 112. That is, vacuum holes 116 directly apply vacuum to sealed chamber 157 including locations 154 at the caul plate 150. As shown in FIG. 2D, an embodiment has a mandrel 184 which includes passageway 185 through circumferential seal 156 and circumferential seal 158, which controllably or otherwise applies vacuum to evacuate sealed chamber 157-3 formed of caul plate 181, circumferential seal 156, circumferential seal 158 and mandrel 184 facilitating atmospheric pressure outside of sealed chamber 157-1 pushing the caul plate 181 towards the mandrel 184 thus consolidating wing panel preform 189. Wing panel preform 189 is laid up upon layup surface 112-2 on mandrel 184. The caul plate 181 therefore consolidates blade stringers 182 as well as wing panel preform 189. In this embodiment, the mandrel 184 defines an OML 131 and the caul plate 181 defines the IML 133 for the wing panel preform 189. The wing panel preform 189 corresponds to section cut 46 of wing panel 30 when wing panel preform 189 is hardened. Therefore, the mandrel 184 for FIG. 2D provides the OML 131-2 with the caul plate 181 providing the IML 133-2.

FIG. 2E illustrates a caul plate 181-1 for a wing panel preform 189-1 in an illustrative embodiment. A caul plate 181-1 having a custom shape to provide an OML 131-3 is overlaid atop wing panel preform 189-1. Blade stringers 182 and support tooling 183-2, 183-3, such as stringer mandrels, are placed against mandrel 184-1. In one embodiment, wing panel preform 189-1 is then laid upon blade stringers 182 and support tooling 183-4. Caul plate 181-1 is then placed upon wing panel preform 189-1. Circumferential seal 156 and circumferential seal 158 are disposed at the periphery of the caul plate 181-1 and the mandrel 184-1 to provide seal redundancy. In FIG. 2A, vacuum system 120-1 controllably or otherwise applies vacuum to vacuum holes 116 via vacuum line 118, which acts as a type of manifold distributor of vacuum to selected locations of the caul plate 150-1. Vacuum holes 116-2 are disposed at the caul plate 150-1, and apply vacuum beyond the layup surface 141. That is, vacuum holes 116 directly apply vacuum to sealed chamber 157. As shown in FIG. 2E, an embodiment has a mandrel 184-1 and caul plate 181-1 with a passageway 185 through circumferential seal 156 and circumferential seal 158. A vacuum travels through passageway 185 from vacuum system 120-1 to evacuate sealed chamber 157-4 formed by caul plate 181-1, circumferential seal 156, circumferential seal 158 and mandrel 184-1. The caul plate 181-1 slips relative to mandrel 184-1 when atmospheric pressure outside of sealed chamber 157-4 pushes the caul plate 181-1 towards the mandrel 184-1, thus consolidating wing panel preform 189-1. The caul plate 181-1 therefore consolidates blade stringers 182 as well as wing panel preform 189-1. In this embodiment, the mandrel 184-1 defines an IML 133-3 and the caul plate 181-1 defines the OML 131-3 for the wing panel preform 189-1. Wing panel preform 189-1 is laid up upon layup surface 112-3 created by blade stringers 182, support tooling 183-3, and mandrel 184-1. The wing panel preform 189-1 corresponds to section cut 46 of wing panel 30 when wing panel preform 189-1 is hardened. Therefore, the mandrel 184-1 for FIG. 2E provides the IML 133-3 with the caul plate 181-1 providing the OML 131-3.

Figure 2F:
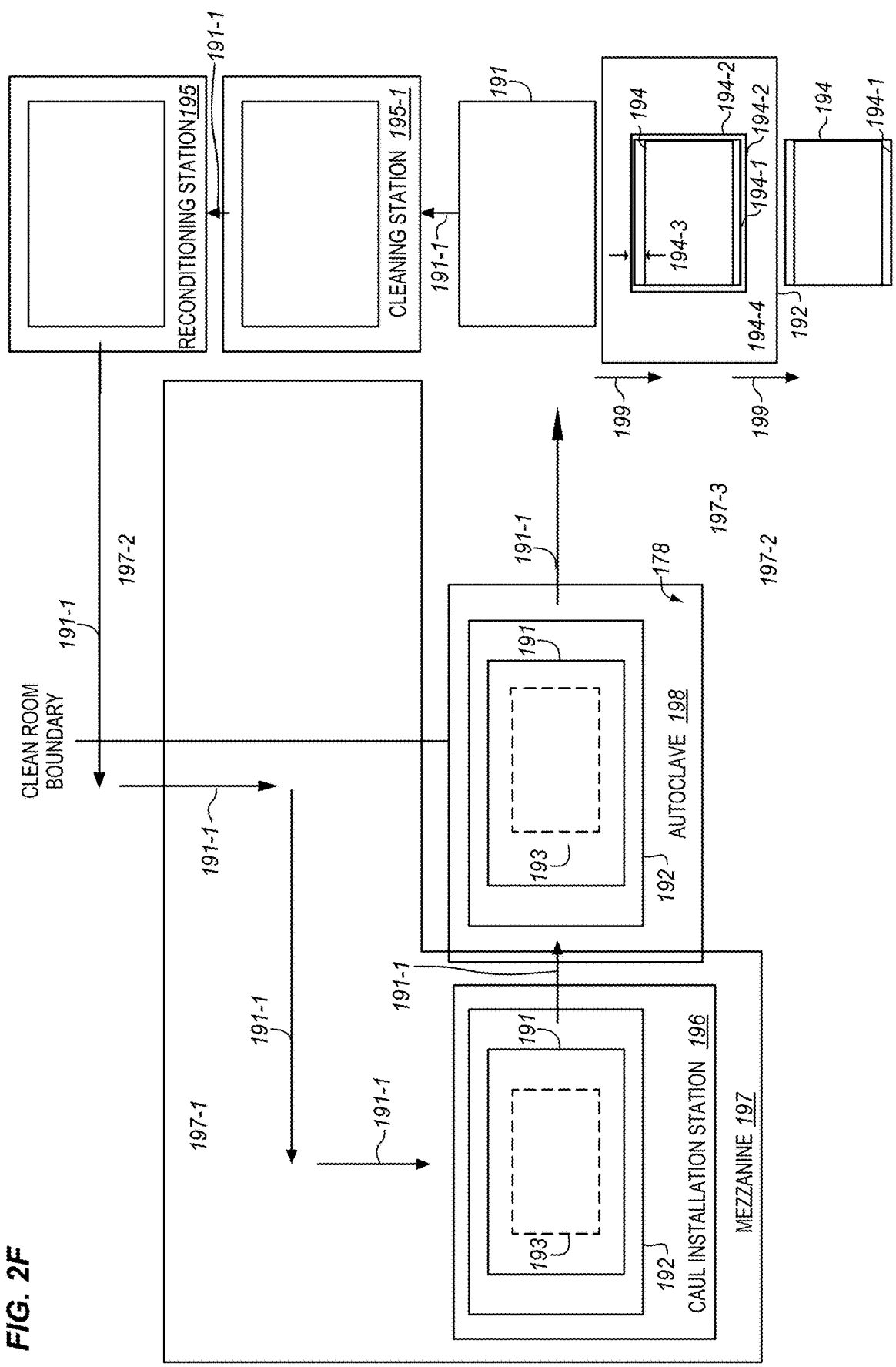
FIG. 2F shows a flow cycle for a caul plate in an illustrative embodiment.

FIG. 2F illustrates a process direction 191-1 for a caul plate 191 in an illustrative embodiment. Caul plate 191 comprises caul plate 181 and 181-1 as well as caul plate 150, 150-1. Mandrel 192 comprises mandrel 184, 184-1 as well as mandrel 110, 110-1. As shown in FIG. 2F, preform 193 is processed in autoclave 198 on mandrel 192 and with caul plate 191 positioned over preform 193. After autoclave processing, caul plate 191 is separated from composite part 194 and mandrel 192. Caul plate 191 is then cleaned and reconditioned at a cleaning station 195-1 and reconditioning station 195 located outside of the clean room environment 197-1. In one embodiment, this comprises returning the caul plate 191 to a condition where it is capable of installation over a preform 193 and onto a mandrel 192 at caul installation station 196. Preform 193 comprises wing panel preform 189, 189-1, and preform 130, 130-1. The caul plate 191 is then placed onto the mandrel 192 and preform 193 at a caul installation station 196. In one embodiment, the mandrel 192 defines a shape for a preform 193 that will be hardened into a wing panel 30 of wing 15, 16. In another embodiment, the mandrel 192 defines a shape for a preform 193 that will be hardened into the half barrel section 24 of the fuselage 12.

In some embodiments, cleaning station 195-1, and reconditioning station 195 and/or caul installation station 196 are disposed at a mezzanine 197 that overlooks a factory floor 197-3. This increases an amount of available space at a factory floor 197-3. In another embodiment, cleaning station 195-1, and reconditioning station 195 are disposed on the factory floor 197-3. The preform 193 is hardened into a composite part 194 at an autoclave 198. The caul plate 191, preform 193, mandrel 192 and composite part 194 are then removed from autoclave 198. Then the caul plate 191 is separated from mandrel 192. The composite part 194 remains on the mandrel 192 after the caul plate 191 is removed. The composite part 194, after caul plate 191 is removed, has a manufacturing excess 194-3 consisting of a flash edge extending out from the composite part 194 and the bearing edge 194-1 material prior to trimming. The trimming occurs as part of the demolding process 194-4. The composite part 194 is trimmed upon the mandrel 110, 110-1. The manufacturing excess 194-3 on composite part 194 is then trimmed to separate flash edge 194-2 from bearing edge 194-1. The composite part 194 is then separated from mandrel 192 and the composite part 194 with bearing edge 194-1. Trimmed off flash edge 194-2 is then discarded. The composite part 194 is sent onward in direction 199 for assembly with other parts. The caul plate 191 may then be lifted onto mezzanine 197 and returned from a non-clean room 197-2 to a clean room 197-1 after passing through at least one cleaning station 195-1 and at least one reconditioning station 195. Another embodiment has the caul plate 191 returned from a non-clean room 197-2 to a clean room 197-1 after passing through at least one cleaning station 195-1 and at least one reconditioning station 195 and lifted onto mezzanine 197. The at least one cleaning station 195-1 and at least one reconditioning station 195 are located on the factory floor 197-3 or on the mezzanine 197 or both. An embodiment has a portion of the mezzanine 197 in the clean room 197-1 and non-clean room 197-2. Using the mezzanine 197 reduces the factory floor 197-3 foot print for the caul plate 191 cycle from placement at caul installation station 196, separation from mandrel 192 through at least one cleaning station 195-1 and at least one reconditioning station 195 to return back to caul installation station 196. While an embodiment has the at least one cleaning station 195-1 and at least one reconditioning station 195 inside clean room 197-1, the illustrated embodiment has the at least one cleaning station 195-1 and at least one reconditioning station 195 located in non-clean room 197-2. In one embodiment, the caul plate 191 is mated to a strongback, such as, strongback 140 of FIGS. 2 and 2A prior to returning through the at least one cleaning station 195-1 and at least one reconditioning station 195 to return back to caul installation station 196.

Further details of the operation of the assembly system 100 will be discussed with regard to FIG. 3. Assume, for this embodiment, that the mandrel 110 is in a clean room (for example clean room 197-1), and is ready to be used to fabricate a composite part 194. Further, assume that, in some examples, a release film 113 has been applied to the layup surface 112 of the mandrel 110.

FIG. 3 is a flowchart illustrating a method for operating an assembly system 100 to harden a preform 130 in an autoclave 180 of an illustrative embodiment. The steps of method 200 are described with reference to assembly system 100 of FIG. 2, but those skilled in the art will appreciate that method 200 may be performed in other systems. The steps of the flowcharts described herein are not all inclusive and may include other steps not shown. The steps described herein may also be performed in an alternative order. Furthermore, although the steps herein are described for fabricating half barrel sections of fuselage, they may be applied to any suitable arcuate sections of fuselage, such as a full barrel section, a half barrel section 24, 1034, one-quarter barrel sections, or other segment sizes. In addition, the steps herein as described are capable of use in fabricating a wing panel 30, 1038.

Step 202 includes applying a preform 130, 130-1, 189, 189-1, 193 to the mandrel 110, 110-1, 184, 184-1, 192. In one embodiment, applying the preform 130, 130-1, 189, 189-1 comprises laying up tows of CFRP onto the mandrel 110, 110-1, 184, 184-1, 192 via an Automated Fiber Placement (AFP) machine, a Flat Tape Layup Machine (FTLM), a Contour Tape Layup Machine (CTLM), end effector, or other device in order to form a multi-layer charge of material having a desired shape. In a further embodiment, applying the preform 130, 130-1, 189, 189-1, 193 comprises picking up and placing a completed preform 130, 130-1, 189, 189-1, 193 or components of a completed preform 130 onto the mandrel 110, 110-1, 184, 184-1, 192.

After the preform 130, 130-1, 189, 189-1, 193 has been applied, the preform 130, 130-1, 189, 189-1, 193 is covered with breather treatment 115 that facilitate uniform evacuation within sealed chamber 157, 157-1 and to a lesser extent degassing the preform 130, 130-1, 189, 189-1, 193 during hardening. Furthermore, in some examples, bladders 160, 160-1 (or other internal mandrels) are placed at desired locations to selectively support stringer preform 164 of the preform 130, 130-1, 189, 189-1, 193, such as preforms for hat stringers). The bladders 160, 160-1 are inflated via atmospheric pressure which is typically autoclave pressure. Circumferential seal 156 and circumferential seal 158 are located between caul plate 150, 150-1, 191, 181, 181-1 and mandrel 110, 110-1, 184, 184-1, 192, and may be adhesively secured into place.

Step 203 comprises indexing the caul plate 150, 150-1, 191, 181, 181-1 to the mandrel 110, 110-1, 184, 184-1, 192. In one embodiment, covering the preform 130, 130-1, 189, 189-1, 193 comprises transporting the caul plate 150, 150-1, 191, 181, 181-1 with a strongback 140, and aligning indexing feature 142 at the strongback 140 with an indexing feature 114 at the mandrel 110, 110-1, 184, 184-1, 192. This action indexes the strongback 140 to the mandrel 110, 110-1, 184, 184-1, 192. Since the caul plate 150, 150-1, 191, 181, 181-1 is transported at a precisely known position and orientation relative to the strongback 140, the location of the caul plate 150, 150-1, 191, 181, 181-1 relative to the mandrel 110, 110-1, 184, 184-1, 192 is also indexed. In another embodiment, aligning indexing feature 142 at the caul plate 150, 150-1, 191, 181, 181-1 with an indexing feature 114 at the mandrel 110, 110-1, 184, 184-1, 192. In further embodiments, indexing comprises aligning the openings 152 at the caul plate 150, 150-1, 191, 181, 181-1 with ports 162 at bladders 160, 160-1 disposed at the preform 130, 130-1, 189, 189-1, 193. This provides for a two-stage indexing process wherein indexing the strongback 140 to mandrel 110, 110-1, 184, 184-1, 192 provides for initial indexing, and indexing the ports 162 and openings 152 provide for fine indexing. Alternatively, a two-stage indexing process can include indexing the caul plate 150, 150-1, 191, 181, 181-1 to mandrel 110, 110-1, 184, 184-1, 192 provides for initial indexing, and indexing the ports 162 and openings 152 provide for fine indexing. That is, the openings 152 at the caul plate 150, 150-1, 191, 181, 181-1 also facilitate indexing of the caul plate 150, 150-1, 191, 181, 181-1 relative to the bladders 160, 160-1. Thus, in one embodiment, method 200 includes applying a bladder 160, 160-1 at the preform 130, 130-1, 189, 189-1, 193 prior to covering the preform 130, 130-1, 189, 189-1, 193 with the caul plate 150, 150-1, 191, 181, 181-1, and aligning an opening 152 in the caul plate 150, 150-1, 191, 181, 181-1 with an inflation port 162 for the bladder 160, 160 to facilitate circumferential and/or fore/aft alignment.

In step 204, the preform 130, 130-1, 189, 189-1, 193 is covered with the caul plate 150, 150-1, 191, 181, 181-1. This comprises lowering the caul plate 150, 150-1, 191, 181, 181-1 into place atop the preform 130, 130-1, 189, 189-1, 193.

In step 206, the caul plate 150, 150-1, 191, 181, 181-1 is sealed to the mandrel 110, 110-1, 184, 184-1, 192. In one embodiment, sealing the caul plate 150, 150-1, 191, 181, 181-1 to the mandrel 110, 110-1, 184, 184-1, 192 comprises applying a first circumferential seal 156, and applying a second circumferential seal 158 that is disposed entirely within the first circumferential seal 156. In a further embodiment, sealing the caul plate 150, 150-1, 191, 181, 181-1 to the mandrel 110, 110-1, 184, 184-1, 192 comprises applying a third circumferential seal 155 that is disposed entirely within the second circumferential seal 158. Step 206 further includes placing the caul plate 150, 150-1, 191, 181, 181-1 against the circumferential seal 156 and circumferential seal 158, and may involve applying adhesives or other compounds that ensure an airtight bond between the caul plate 150, 150-1, 191, 181, 181-1 and the circumferential seal 156 and circumferential seal 158. Further, the volume between the first circumferential seal 156 and the second circumferential seal 158 may be subdivided into quadrants (as will be further discussed in FIG. 6) thus providing a further level of seal redundancy. Banjo bolts 170, which include threading that is complementary to threading at each inflation port 162, are secured to/installed at inflation ports 162 of the bladders 160. This serves to seal the openings 152 of the caul plate 150, 150-1, 191, 181, 181-1 along with other seals if needed, thereby preventing air from escaping the caul plate 150, 150-1, 191, 181, 181-1 via the openings 152.

In short, step 206 may comprise sealing the caul plate 150, 150-1, 191, 181, 181-1 to one or more bladders via banjo bolts 170, and inflating the bladders 160, 160-1 while hardening the preform 130, 130-1, 189, 189-1, 193. Thus, in at least one embodiment, sealing the caul plate 150, 150-1, 191, 181, 181-1 to the bladder 160, 160-1 is performed by screwing a banjo bolt 170 into the inflation port 162.

In step 208, vacuum system 120, 120-1 evacuates air from sealed chamber 157, 157-1 that is between the mandrel 110, 110-1, 184, 184-1, 192 and the caul plate 150, 150-1, 191, 181, 181-1, thereby using atmospheric pressure to push the caul plate 150, 150-1, 191, 181, 181-1 towards/against the preform 130, 130-1, 189, 189-1, 193. In one embodiment, this comprises applying a vacuum at the mandrel 110, 110-1, 184, 184-1, 192 that directly pulls the caul plate 150, 150-1, 191, 181, 181-1 towards the preform 130, 130-1, 189, 189-1, 193. The vacuum at the mandrel 110, 110-1, 184, 184-1, 192 controllably or otherwise applies vacuum directly to the caul plate 150, 150-1, 191, 181, 181-1. In another embodiment, the evacuation of the sealed chamber 157, 157-1 is accomplished through circumferential seal 156 and circumferential seal 158 and/or through caul plate 150, 150-1, 191, 181, 181-1. This operation holds the caul plate 150, 150-1, 191, 181, 181-1 tightly against the circumferential seal 156 and circumferential seal 158 and also consolidates the preform 130, 130-1, 189, 189-1, 193. In one embodiment, the caul plate 150, 150-1, 191, 181, 181-1 is pushed towards the mandrel 110, 110-1, 184, 184-1, 192 at 90 pounds per square inch of pressure or more. The mandrel 110, 110-1, 184, 184-1, 192 is then placed into the autoclave 180, which is pressurized. The autoclave 180 pressure inflates the bladders 160, 160-1 via the banjo bolts 170, after which the autoclave 180 is heated to a hardening temperature. Thus, the stringer preform 164 is pressurized and shaped via the inflation of bladders 160, 160-1 during the hardening.

In step 210 the preform 130, 130-1, 189, 189-1, 193 is hardened into a composite part 194 while the caul plate 150, 150-1, 191, 181, 181-1 is held against the preform 130, 130-1, 189, 189-1, 193. That is, after the caul plate 150, 150-1, 191, 181, 181-1 has been vacuumed into place and during the holding of the caul plate 150, 150-1, 191, 181, 181-1 in place, hardening occurs. In one embodiment, this comprises operating the autoclave 180 to maintain heat and pressure, while simultaneously operating the vacuum system 120, 120-1 at the mandrel 110, 110-1, 184, 184-1, 192, in order to consolidate and harden the preform 130, 130-1, 189, 189-1, 193 while enforcing a desired shape onto the preform 130, 130-1, 189, 189-1, 193.

In step 212, the caul plate 150, 150-1, 191, 181, 181-1 is removed from the composite part 194, and in step 214 the caul plate 150, 150-1, 191, 181, 181-1 is cleaned, for example via the application of chemicals and fluids in order to remove composite materials, the use of scrubbing/scouring, etc. In some examples, the caul plate 150, 150-1, 191, 181, 181-1 is reconditioned or repaired as needed in step 215. In step 216, the caul plate 150, 150-1, 191, 181, 181-1 is returned to a clean room 197-1, where it may be re-used to facilitate hardening of another preform 130, 130-1, 189, 189-1, 193.

Method 200 provides a technical benefit over prior systems and techniques because it eliminates the need to vacuum bag the preform 130, 130-1, 189, 189-1, 193, test the vacuum bags and then place a caul plate(s) and possibly again vacuum check the vacuum bags and then place the assembly into autoclave 180. Thus, prior two-step processes which required placing and sealing a vacuum bag into position, testing the vacuum bag, and then indexing and placing a caul plate, is replaced with a single-step process of placing a caul plate 150, 150-1, 191, 181, 181-1. Method 200 utilizes a caul plate 150, 150-1, 191, 181, 181-1 to perform the same role for which vacuum bags were previously relied. This reduces the amount of labor and material used pertaining to the hardening process, which beneficially enhances efficiency. For example, the need for vacuum bags and other disposable components is reduced or eliminated, which results in material and labor savings before hardening occurs.

Figure 4:
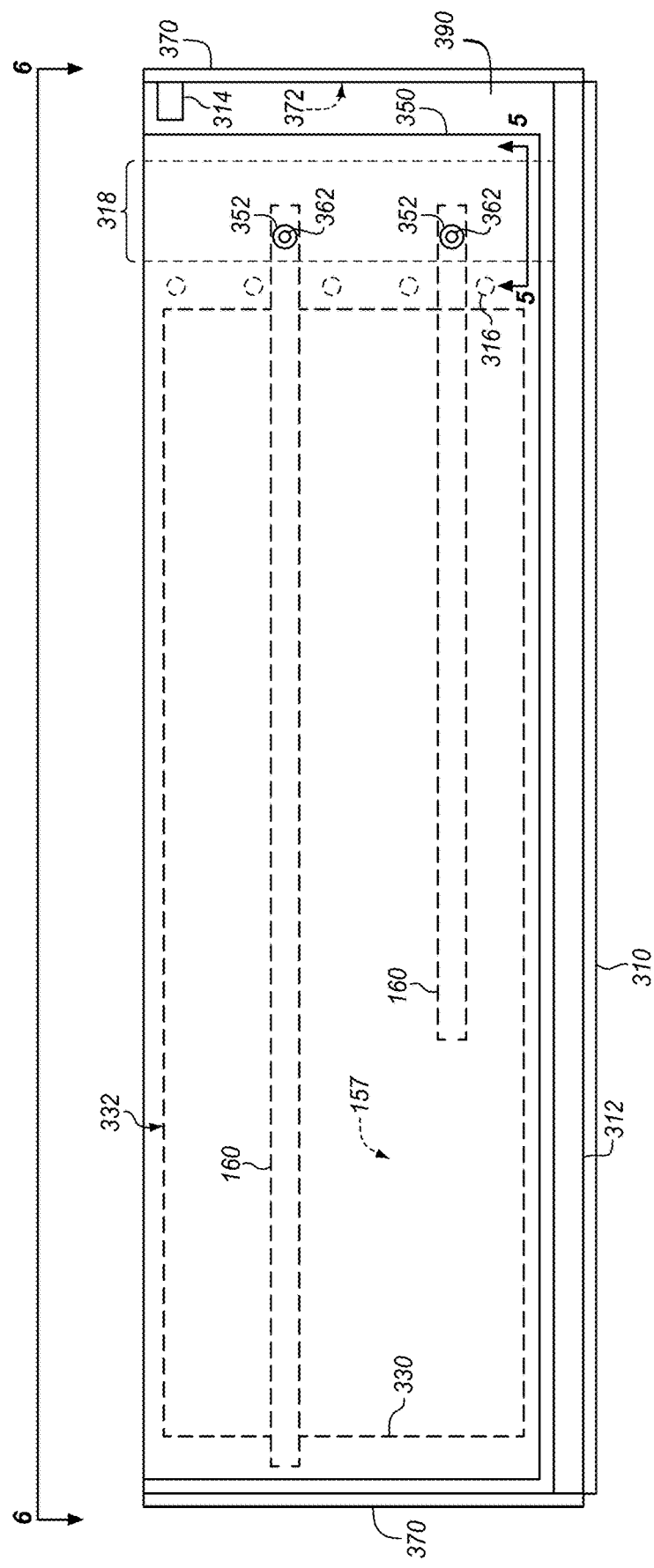
FIG. 4 is a side view of a mandrel that includes a caul plate which operates as a vacuum bag in an illustrative embodiment.

FIG. 4 is a side view of a mandrel 310 that includes a caul plate 350 which operates as a vacuum bag in an illustrative embodiment. From this view, the mandrel 310 appears to be rectangular such as half a cylinder appears rectangular when viewed from the side, but the mandrel 310 forms a half barrel section 24 when hardened of which only one side is presently viewed. According to FIG. 4, the caul plate 350 covers a preform 330, and the bladders 160, 160-1 are placed within stringer preform 164 at the preform 330. The bladders 160, 160-1 include ports 362, which are exposed via openings 352 into the caul plate 350. Caul plate 350 corresponds to caul plate 150, 150-1, 191, 181, 181-1. Mandrel 310 corresponds to mandrel 110, 110-1, 184, 184-1, 192. Preform 330 corresponds to preform 130, 130-1, 189, 189-1, 193.

The mandrel 310 includes vacuum holes 316, which directly apply vacuum to the caul plate 350, pressing the caul plate 350 into the preform 330. The caul plate 350, radial seals 370 and mandrel 310 together define a vacuum chamber 390 that is evacuated when vacuum is applied via vacuum holes 316. The vacuum holes 316 are located beyond a preform perimeter 332, but within a perimeter 372 of the radial seals 370. Because the caul plate 350 is sealed, for example, at ramp 318, air does not leak out into an autoclave 180 during hardening of the preform 330 into a composite part 194. Furthermore, the mandrel 310 includes an indexing feature 314 that mates with a strongback 140 and facilitates placement and orientation of the caul plate 350 upon the mandrel 310. Radial seals 370 and bottom seal 312 enable the mandrel 310 to be sealed into place within autoclave 180.

Figure 5:
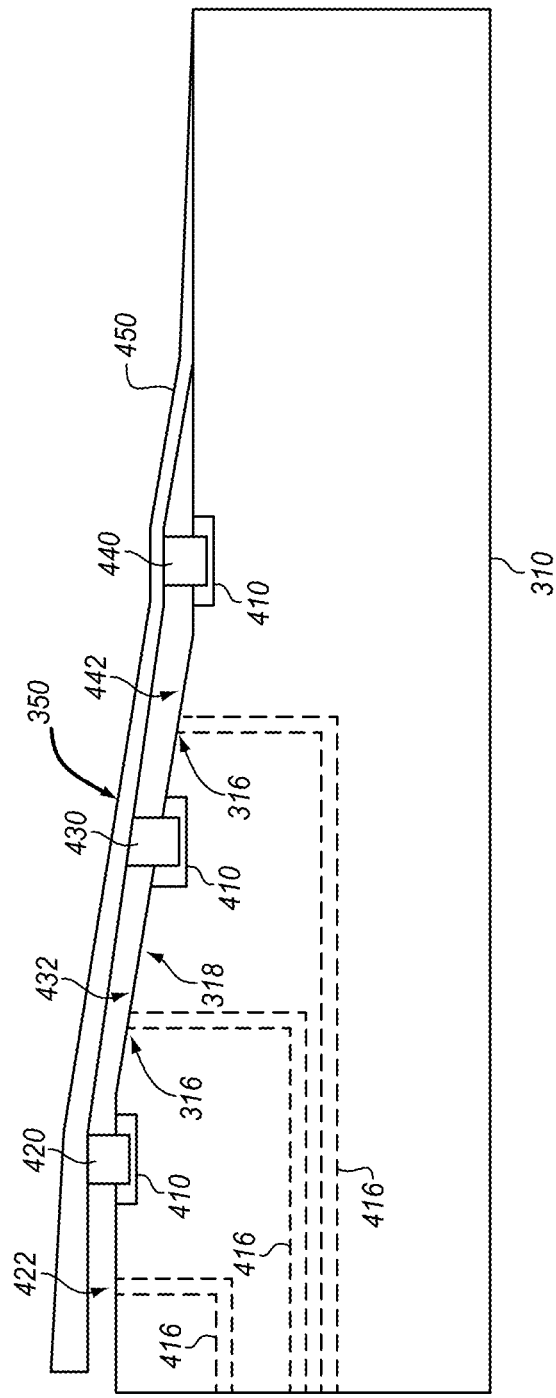
FIG. 5 is a cut-through view of a mandrel that includes a caul plate which operates as a vacuum bag in an illustrative embodiment.

FIG. 5 is a cut-through view of a mandrel 310 that includes a caul plate 350 which performs the function of a vacuum bag and caul plate in an illustrative embodiment, and corresponds with view arrows 5 of FIG. 4. In FIG. 4, ramp 318 of mandrel 310 is visible, as is caul plate 350. Circumferential seals 420, 430, and 440 are disposed at channels 410 (e.g., channels having a half-circle cross-section) in the mandrel 310 to seal the caul plate 350 into three unique and independent chambers 422, 432, and 442. Chamber 442 corresponds to sealed chamber 157, 157-1. This seal redundancy of circumferential seals 420, 430, and 440 helps to prevent the preform from encountering any vacuum leaks. That is, having independent chambers 422, 432, and 442 provides a technical benefit, because it enables hardening to be successfully performed at desired caul plate 350 compression even if a single circumferential seal of circumferential seals 420, 430, and 440 fails during the hardening process. Furthermore, vacuum holes 316 apply vacuum via vacuum lines 416 that pull the caul plate 350 into contact with the seals. An elastomeric flap 450 extends from the caul plate 350 and lays flat against the mandrel 310. The elastomeric flap 450 may be taped, glued, or otherwise sealed to the mandrel 310 if desired in order to provide additional seal protection against leakage, resulting in more redundancy. In further embodiments, no ramp 318 is utilized, in order to ensure that the mandrel 310 and caul plate 350 remain at a constant diameter. While circumferential seal 156 and circumferential seal 158 are shown in FIG. 2D and FIG. 2E, the three seal system of circumferential seals 420, 430, and 440 along with flap 450 could be used.

Figure 6:
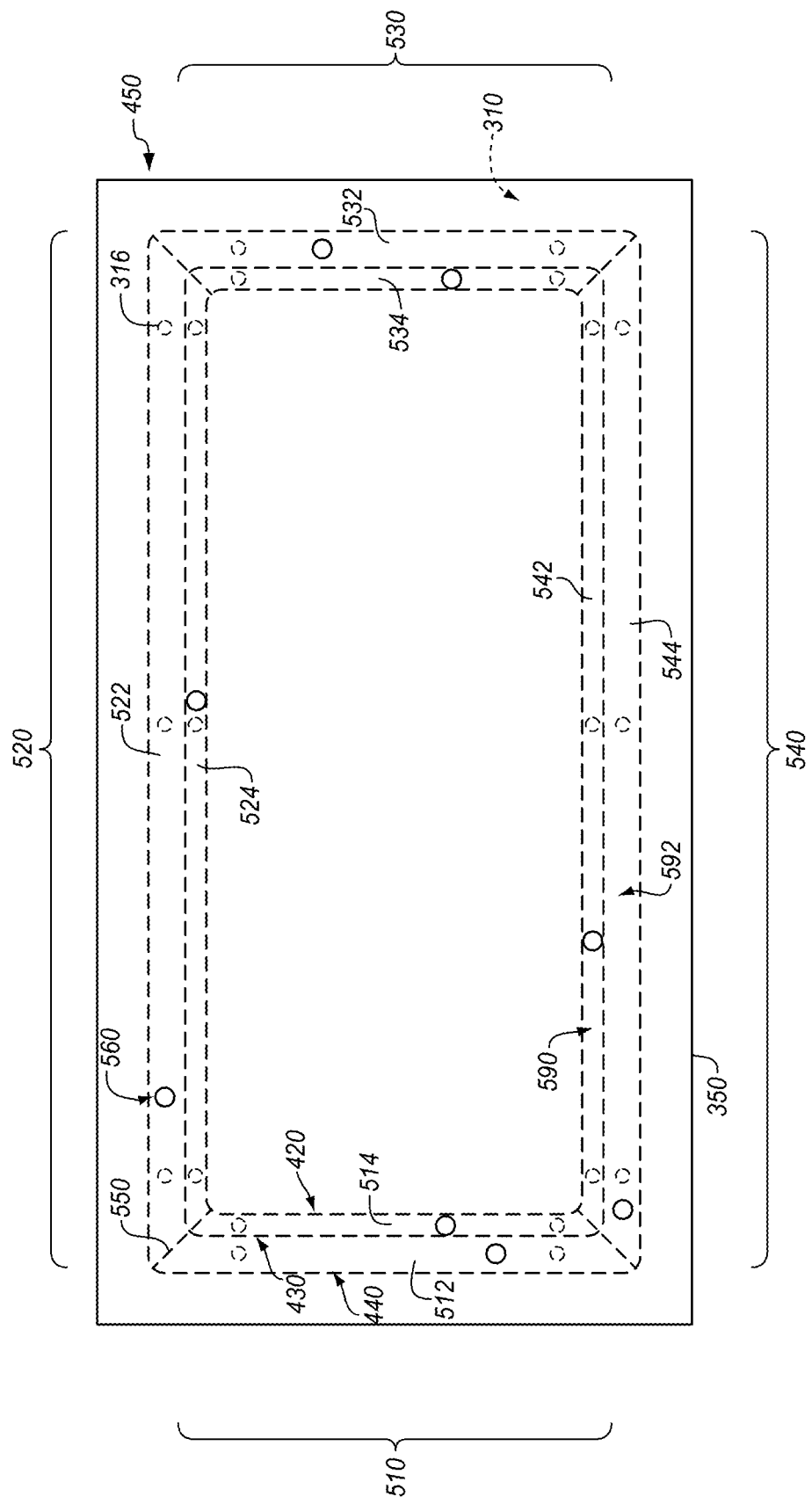
FIG. 6 is a top view of a caul plate that includes peripheral chambers subdivided into quadrants in an illustrative embodiment.

FIG. 6 is a top view of a caul plate 350 and the mandrel 310 which corresponds with view arrows 6 of FIG. 4 and appears to be rectangular such as half a cylinder appears rectangular when viewed from the top. The caul plate 350 and the mandrel 310 includes peripheral chambers 590 and 592 that are subdivided into quadrants 510, 520, 530, and 540 by seals 550 in an illustrative embodiment. According to FIG. 6, the caul plate 350 covers the circumferential seals 420, 430, and 440 of FIG. 5, and further covers the seals 550, which subdivide the circumferential seals 420, 430, and 440 into quadrants 510, 520, 530, and 540. Pressure sensors 560 are disposed at chambers 512, 514, 522, 524, 532, 534, 542, and 544 in each of the quadrants 510, 520, 530, and 540, and may be integrated into the caul plate 350 or the mandrel 310. For example, in one embodiment a pressure sensor 560 is disposed in chambers 512 and 514 of quadrant 510, chambers 522 and 524 of quadrant 520, chambers 532 and 534 of quadrant 530, and chambers 542 and 544 of quadrant 540. Input from pressure sensors 560 is used to determine whether leaks exist in any of the chambers, and specifically what quadrant. Thus, seals 550 act as additional seals that subdivide a volume between the circumferential seals into quadrants 510, 520, 530, and 540 or other segments. Vacuum holes 316 beneath the caul plate 350 are also depicted, and are used to evacuate air disposed between the caul plate 350 and an underlying mandrel 310. The advantage of dividing into quadrants is a further level of seal redundancy. For instance, if a seal leak occurs in chamber 522, it is isolated to that quadrant 520 and does not compromise chambers 532, 544 or 512. Without dividing into quadrants 510, 520, 530, and 540 with seals 550, a leak in the area of chamber 522 through circumferential seal 156 and a leak through circumferential seal 158 in the area of chamber 542 could otherwise lead to the preform 130 being subjected to atmospheric pressure during hardening.

Figure 7:
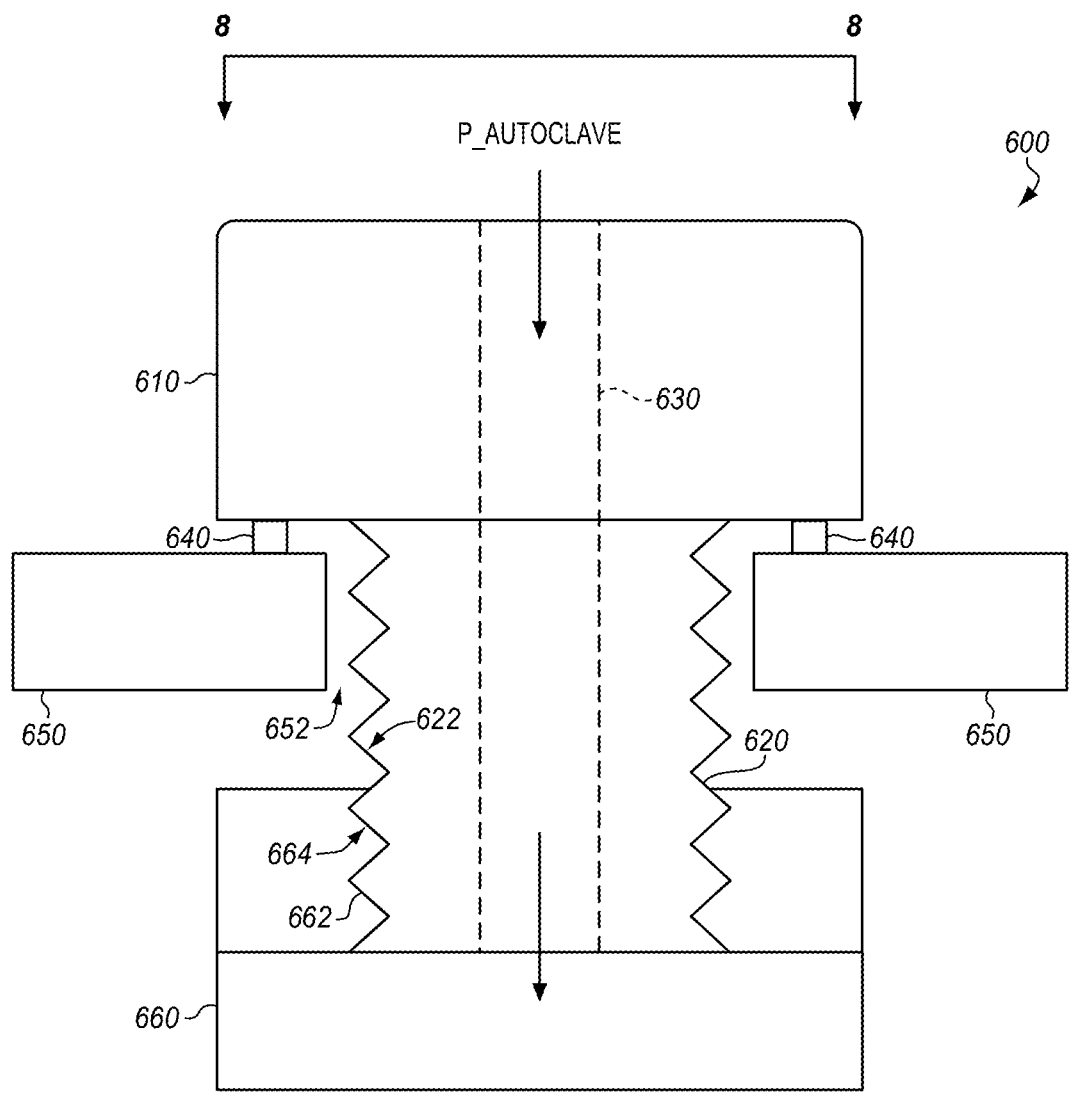
FIG. 7 is a side view of a banjo bolt that seals a caul plate to a bladder while also providing a passageway for air to enter the bladder in an illustrative embodiment.
Figure 8:
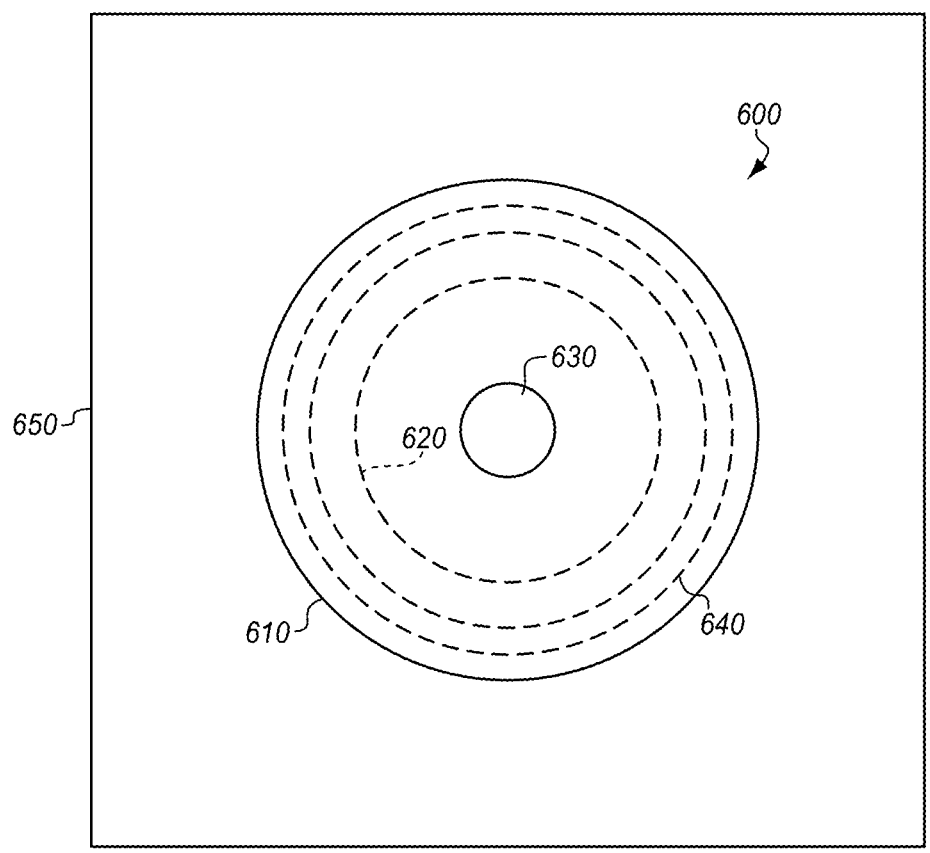
FIG. 8 is a top view of a banjo bolt that seals a caul plate to a bladder while also providing a passageway for air to enter the bladder in an illustrative embodiment.

FIG. 7 and FIG. 8 are views of a banjo bolt 600 that seals a caul plate 650 to a bladder 660 while also providing a passageway 630 for air to enter the bladder in an illustrative embodiment. Bladder 660 corresponds to bladder 160, 160-1. Passageway 630 enables air at an autoclave pressure (P_AUTOCLAVE) to enter into the bladder 660, causing the bladder 660 to inflate. The banjo bolt 600 includes head 610, from which an annular seal 640 protrudes. The annular seal 640 seals the banjo bolt 600 to the caul plate 650 as the banjo bolt 600 is threaded into port 662 of the bladder 660, which prevents air leaks from opening 652. Annular seal 640 corresponds to seal 152-1. Opening 652 corresponds to opening 152. The banjo bolt 600 further includes shaft 620 having threading 622, which is complementary to threading 664 at the port 662. FIG. 8 corresponds with view arrows 8 of FIG. 7, and provides additional detail illustrating the head 610, passageway 630, annular seal 640, and other components of the banjo bolt 600 not illustrated in FIG. 7.

Figure 9:
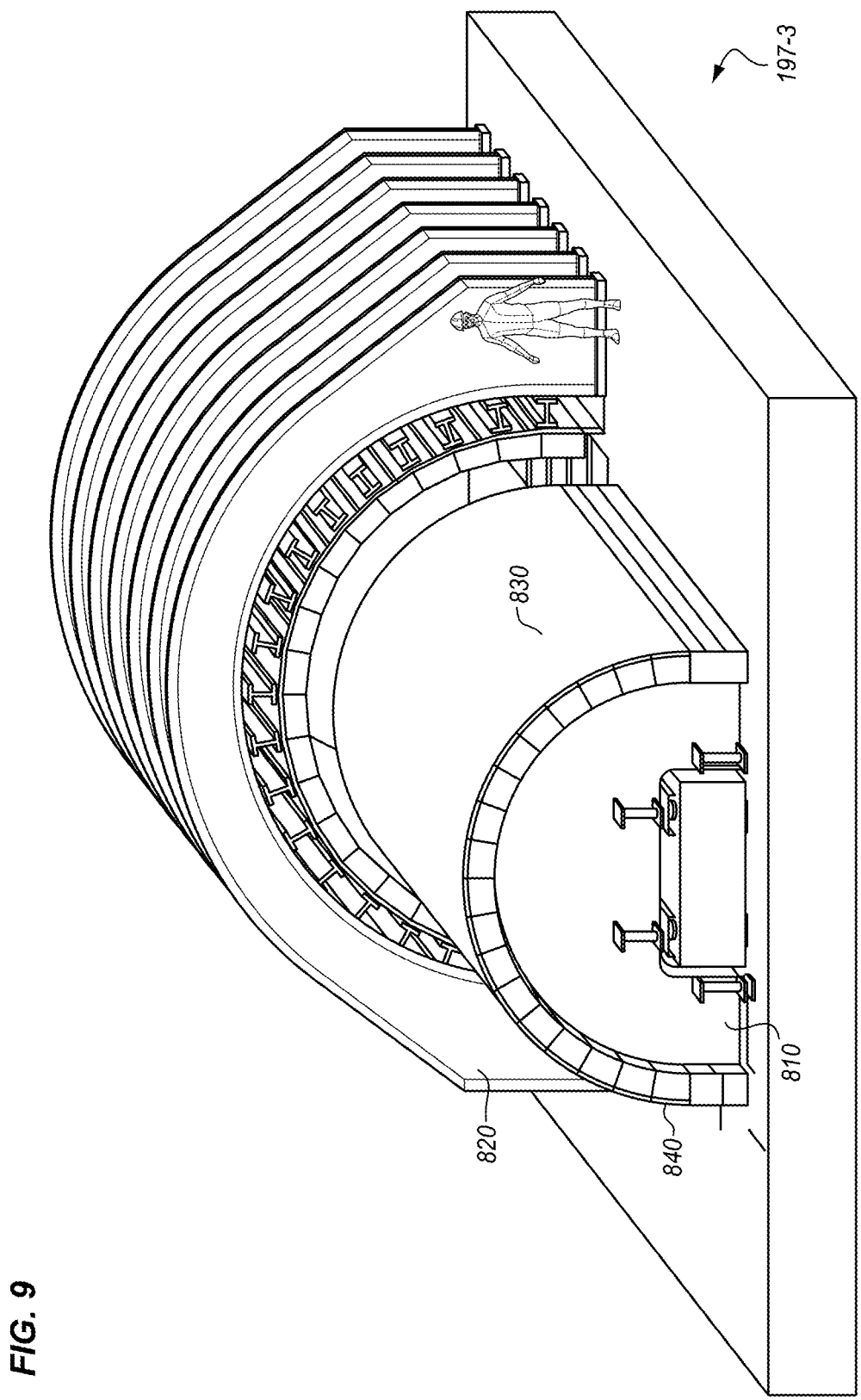
FIG. 9 is a perspective view of insertion of a mandrel into an autoclave in an illustrative embodiment.
Figure 10:
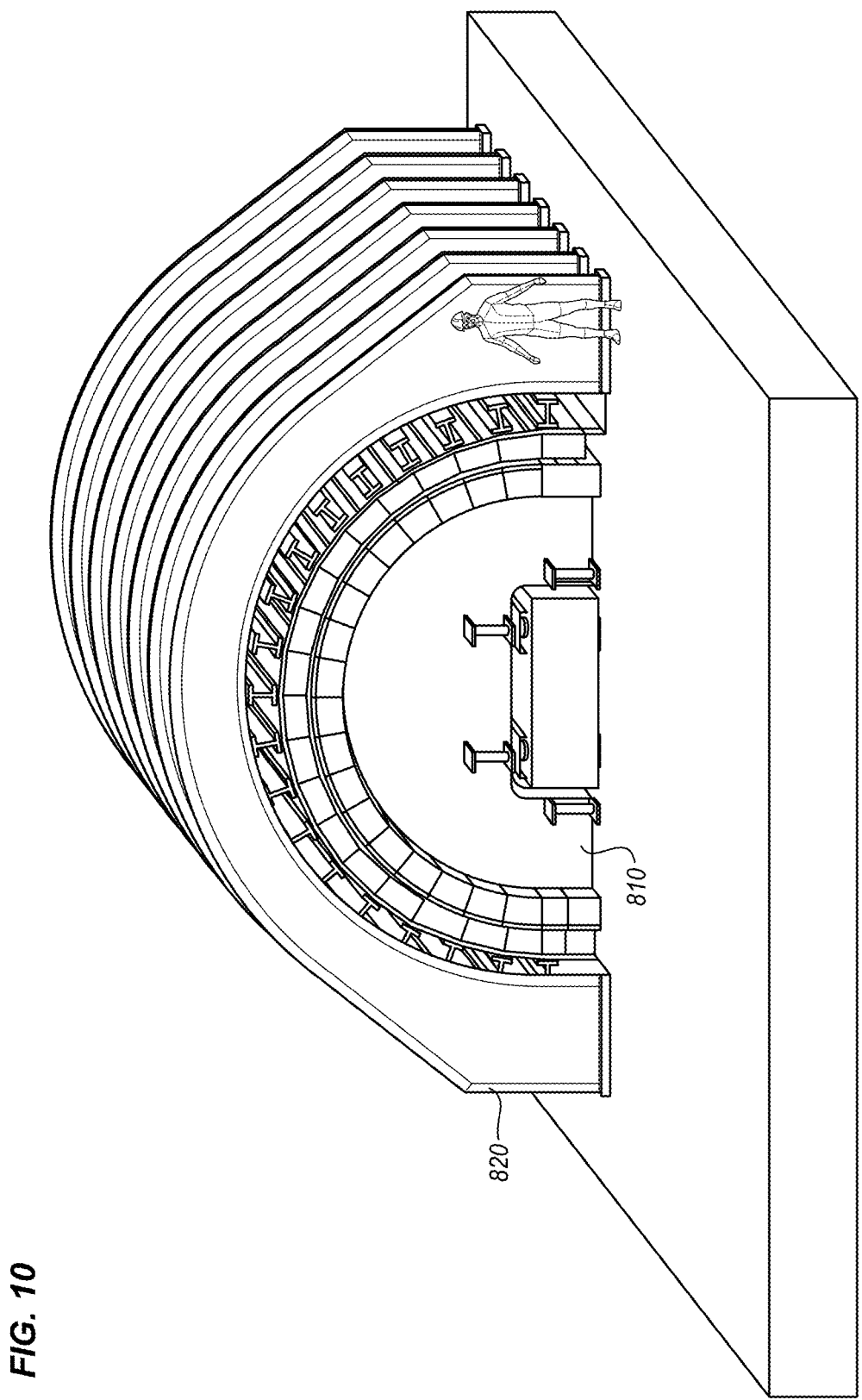
FIG. 10 is a perspective view of insertion of a mandrel into an autoclave in an illustrative embodiment.

FIG. 9 and FIG. 10 are perspective views of insertion of a mandrel 810 into an autoclave 820 on a factory floor 197-3 in an illustrative embodiment. Mandrel 810 corresponds to mandrel 110, 110-1, 310, 192. As shown in FIG. 9, the mandrel 810 forms a half barrel shape, upon which a caul plate 830 covers a preform (beneath the caul plate 830) for hardening into a composite part. Caul plate 830 corresponds to caul plate 150, 150-1, 350, 181-1. Preform 840 corresponds to preform 130, 130-1, 330, 193. The caul plate 830 is held in place via a vacuum applied by the mandrel 810. The mandrel 810 is moved into the autoclave 820 in FIG. 10, and then sealed in place. The autoclave 820 is heated and pressurized, and the preform is hardened to a composite part 194, which is demolded after the mandrel 810 is removed from the autoclave 820. FIG. 9 and FIG. 10 illustrate but one autoclave arrangement out of numerous possibilities, and other arrangement for an autoclave 820 may be utilized with the systems and methods described herein.

In the following examples, additional processes, systems, and methods are described in the context of a caul plate that is directly vacuum sealed to a mandrel to apply consolidation forces to a preform during hardening.

Figure 11:
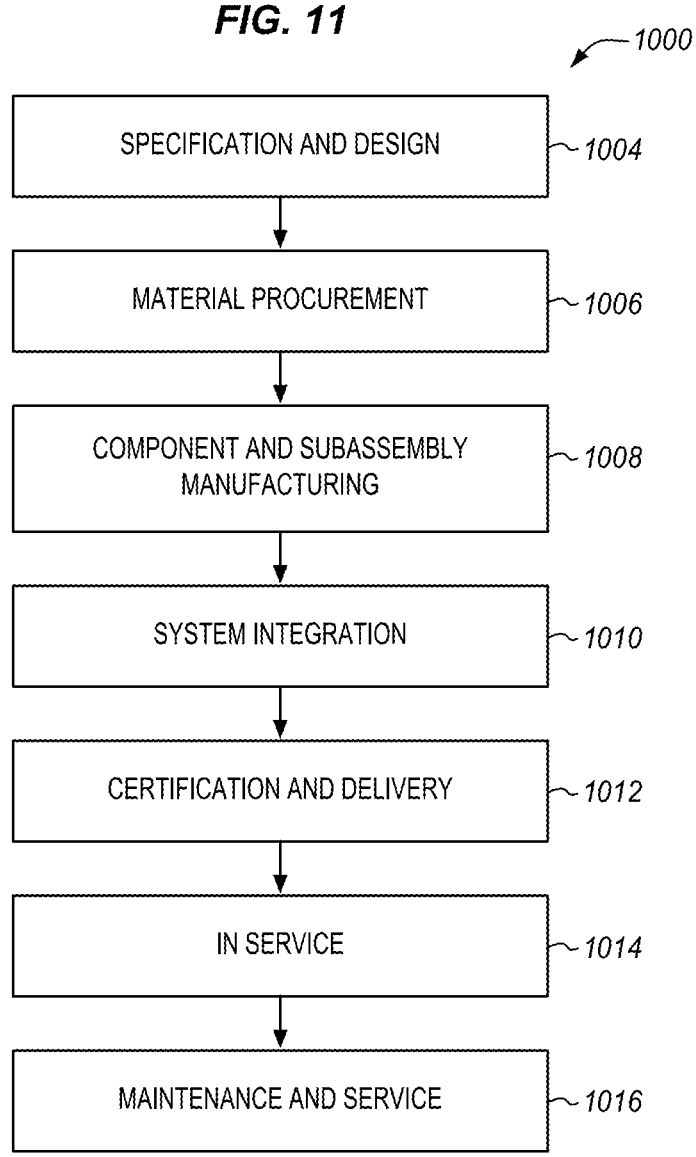
FIG. 11 is a flow diagram of aircraft production and service methodology in an illustrative embodiment.

Referring more particularly to the drawings, embodiments of the disclosure may be described in the context of aircraft manufacturing and service in method 1000 as shown in FIG. 11 and an aircraft 1002 as shown in FIG. 12. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. The airframe 1018 includes a full barrel section 1032 further comprising a half barrel section 1034 and a wing assembly 1036 further comprising a wing panel 1038. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. Thus, the invention may be used in any stages discussed herein, or any combination thereof, such as specification and design 1004, material procurement 1006, component and subassembly manufacturing 1008, system integration 1010, certification and delivery 1012, service 1014, maintenance and service 1016 and/or any suitable component of aircraft 1002 (e.g., airframe 1018, systems 1020, interior 1022, propulsion system 1024, electrical system 1026, hydraulic system 1028, and/or environmental 1030).

In one embodiment, a part comprises a portion of airframe 1018, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for hardening a preform of fiber reinforced material, the method comprising:
   applying a preform to a mandrel;
   covering the preform with a caul plate;
   vacuum sealing the caul plate to the mandrel via a first circumferential seal in a clean room environment, the first circumferential seal disposed between the mandrel and the caul plate in a channel formed in the mandrel;
   inserting a bladder into a stringer preform;
   disposing the bladder and the stringer preform between the caul plate and the mandrel;
   two-stage indexing comprising indexing the caul plate to the mandrel to provide initial indexing and indexing an inflation port of the bladder to an opening of the caul plate to provide for fine indexing;
   pushing the caul plate toward the preform, the stringer preform, and the mandrel;
   hardening the preform and the stringer preform into a composite part while the caul plate is held against the preform;
   separating the caul plate from the composite part;
   cleaning the caul plate at a cleaning station outside of the clean room environment; and
   returning the caul plate to the clean room environment where it may be re-used with the mandrel for hardening of a second preform.

2. The method of claim 1 comprising:
   evacuating air within a sealed chamber bound by the caul plate, the first circumferential seal, and the mandrel, to allow atmospheric pressure to push the caul plate towards the preform, the stringer preform, and the mandrel.

3. The method of claim 2 further comprising:
   sealing an elastomeric flap to the mandrel, wherein the elastomeric flap extends from the caul plate and wherein the first circumferential seal is disposed between the flap and the sealed chamber.

4. The method of claim 2 further comprising:
   inserting the bladder into the stringer preform prior to covering the preform with the caul plate.

5. The method of claim 4 further comprising:
   sealing the caul plate to the bladder; and
   inflating the bladder.

6. The method of claim 5 further comprising:
   inflating the bladder by opening the bladder interior to atmospheric pressure when the sealed chamber is evacuated.

7. The method of claim 6 further comprising:
   pressurizing and shaping the stringer preform with bladder inflation.

8. The method of claim 5 wherein:
   sealing the caul plate to the bladder is performed by screwing a banjo bolt into the inflation port.

9. The method of claim 4 wherein:
   the caul plate consolidates the stringer preform against the mandrel.

10. The method of claim 1 wherein indexing the caul plate to the mandrel comprises aligning an indexing feature of the caul plate with an indexing feature of the mandrel.

11. The method of claim 1, further comprising:
    transporting the caul plate with a strongback and wherein indexing the caul plate to the mandrel comprises aligning an indexing feature at the strongback with an indexing feature at the mandrel.

12. The method of claim 1 wherein vacuum sealing the caul plate to the mandrel further comprises:
    vacuum sealing the caul plate to the mandrel via a second circumferential seal disposed entirely within the first circumferential seal.

13. The method of claim 12 wherein vacuum sealing the caul plate to the mandrel further comprises:
    vacuum sealing the caul plate to the mandrel via a third circumferential seal disposed entirely within the second circumferential seal.

14. The method of claim 13 further comprising:
    subdividing a volume between the first circumferential seal and the second circumferential seal into quadrants.

15. The method of claim 13 further comprising:
    slipping the mandrel relative to caul plate at one of the first, second, or third circumferential seals.

16. The method of claim 1 wherein:
    the caul plate forms an Outer Mold Line (OML) and the mandrel forms an Inner Mold Line (IML) for a section of fuselage.

17. The method of claim 16 wherein:
    the section of fuselage is a half barrel section.

18. The method of claim 16 wherein:
    the section of fuselage is a full barrel section.

19. The method of claim 1 wherein:
    the caul plate forms an Inner Mold Line (IML) and the mandrel forms an Outer Mold Line (OML) for a section of fuselage.

20. The method of claim 1 wherein:
    the mandrel further comprises a vacuum system that controllably applies a vacuum via vacuum holes at the mandrel.

21. The method of claim 1 wherein:
the caul plate further comprises a vacuum system that controllably applies a vacuum via vacuum holes at the caul plate.

22. The method of claim 1 wherein:
the inflation port of the bladder is fastened through the opening in the caul plate.

23. The method of claim 1 wherein:
the channel formed in the mandrel has a half-circle cross-section.

24. The method of claim 1 wherein:
the caul plate forms a half barrel shape of half barrel sections for a section of fuselage.

\* \* \* \* \*